United States Patent [19]
Rasmusson

[11] Patent Number: 6,089,511
[45] Date of Patent: Jul. 18, 2000

[54] METHOD AND APPARATUS FOR PROPULSION

[76] Inventor: James K. Rasmusson, 421 E. 24th St., Holland, Mich. 49423

[21] Appl. No.: 09/013,653

[22] Filed: Jan. 26, 1998

Related U.S. Application Data

[60] Provisional application No. 60/036,365, Jan. 24, 1997.

[51] Int. Cl.[7] ............................................. B64G 1/40
[52] U.S. Cl. ..................... 244/172; 244/62; 244/158 R; 74/84 S
[58] Field of Search .................... 212/272, 273; 188/378; 74/574, 84 S, 84 R; 244/164, 158 R, 172, 62

[56] References Cited

U.S. PATENT DOCUMENTS 3,302,905  2/1967  Davis ......................................... 244/170

Primary Examiner—Galen L. Barefoot
Attorney, Agent, or Firm—Young & Basile, P.C.

[57] ABSTRACT

A method and apparatus is disclosed for providing a propulsive force to a dynamic body without having to interact with an external mass. The technique is based on an internal exchange of kinetic energy working in concert with the influence of an ancillary force such as gravity to produce a net momentum change in the body. In one embodiment a body may be rotated through space without having to expel propellant or otherwise resort to an interaction with an external mass. In another embodiment, the invention can be used to dampen a swaying motion or vibration of a body such as a tall, earth-bound tower or a beam in a space station when there is no convenient external mass to which the body may be anchored.

18 Claims, 28 Drawing Sheets

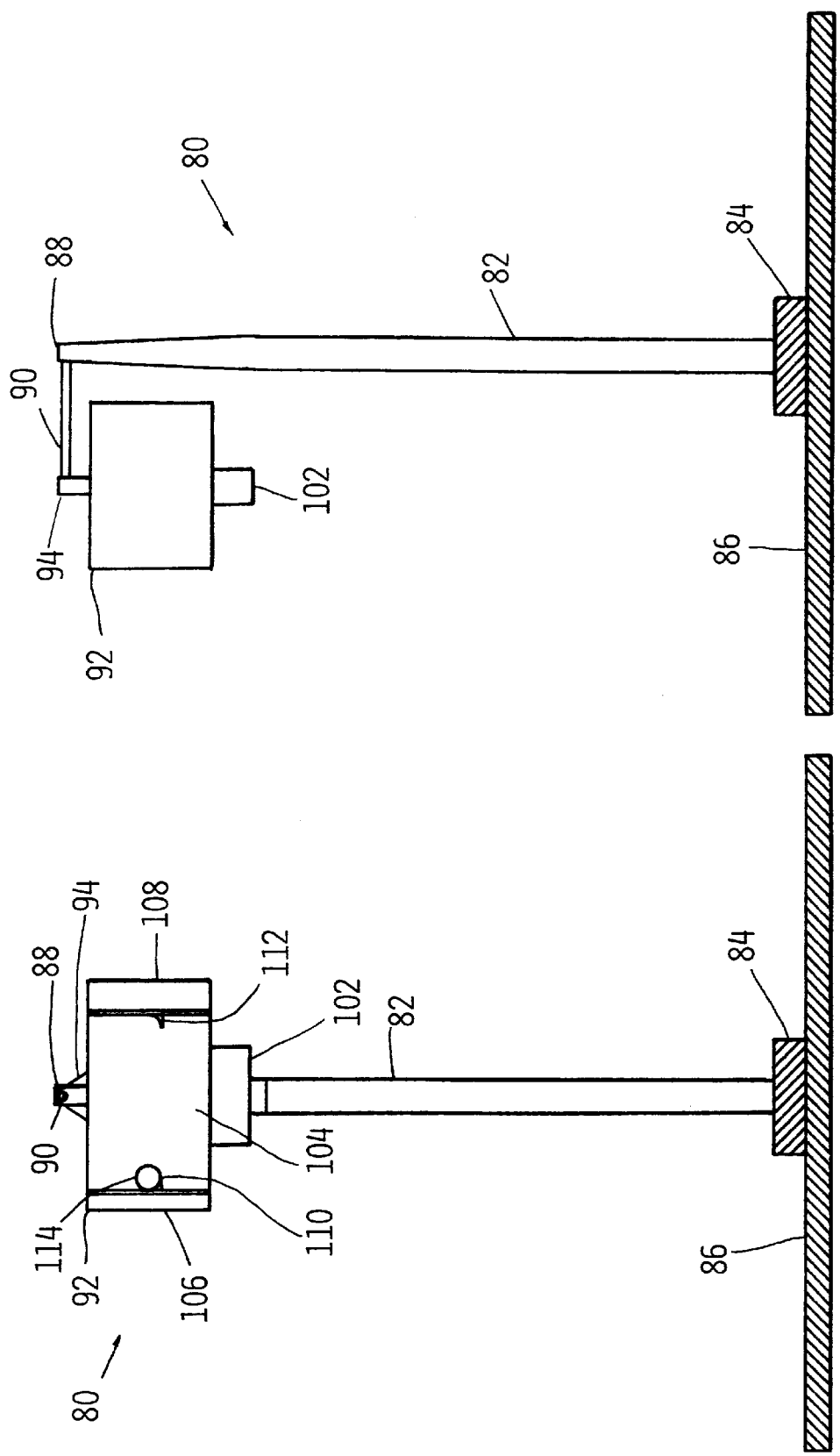

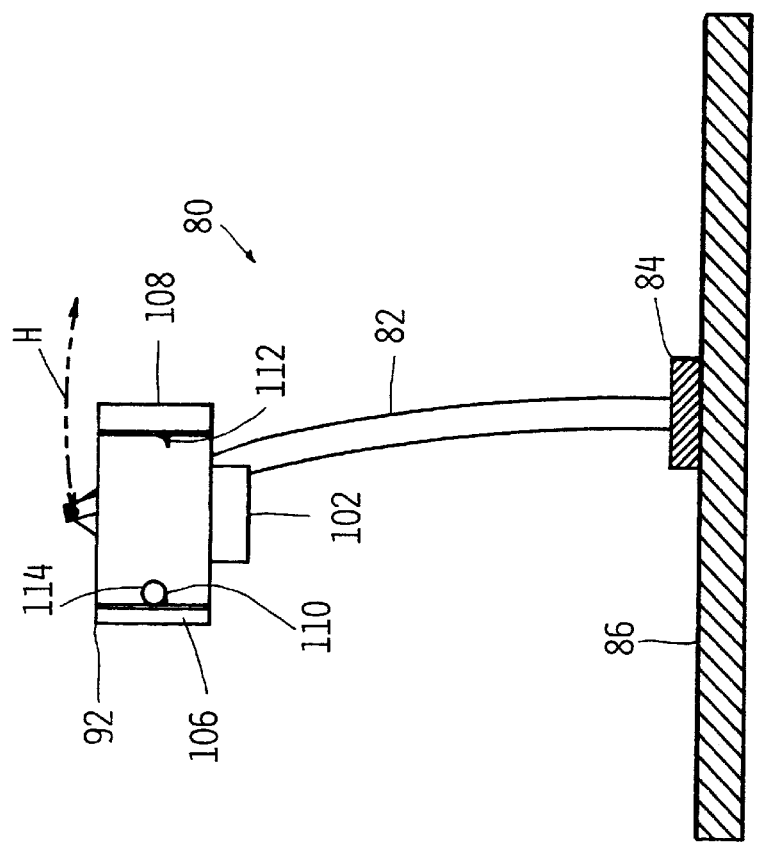
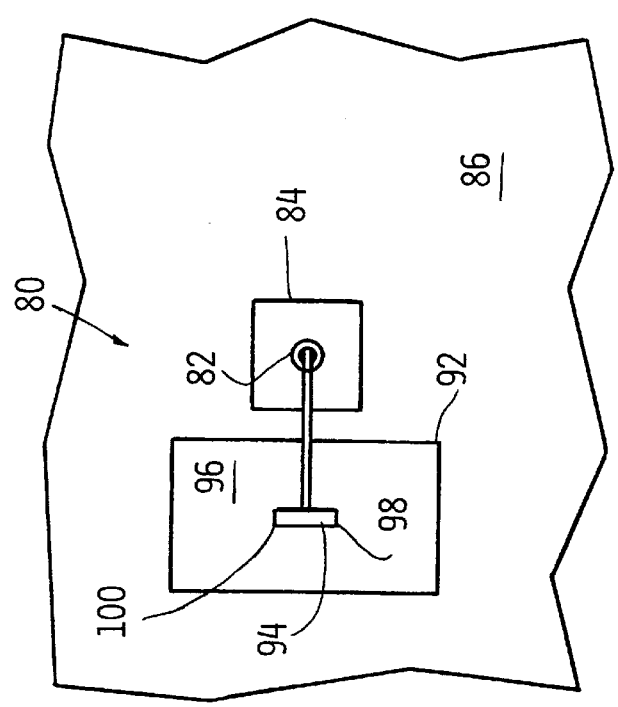
FIG. 11
FIG. 10

METHOD AND APPARATUS FOR PROPULSION

RELATED APPLICATIONS

This application claims priority under 35 U.S.C. 119(e) based on U.S. Provisional Patent Application Serial No. 60/036,365, filed Jan. 24, 1997, the disclosure of which is hereby incorporated by reference in its entirety.

FIELD OF THE INVENTION

This invention relates to kinetic propulsion and energy conversion.

BACKGROUND OF THE INVENTION

Physics of Force

This invention is based on a branch of physics known as classical mechanics. Classical mechanics deals with the natural laws of motion, and is often associated with the ground-breaking work of Sir Isaac Newton. Newton, working in the late 17th and early 18th Centuries, realized that for every force exerted on a body, there is an equal but opposite reactive force. Imagine someone who pushes a shopping cart while standing on roller skates. Experience tells us that the cart will move forward and the person pushing the cart will tend to roll backward in the opposite direction. This is an everyday example of the principle that every action has an equal and opposite reaction.

This principle is the basis for all manner of propulsion, including walking, jet travel and rocketry. For example, a rocket propels itself through space by expelling matter in the form of burning propellant. The expulsion of matter through the tail of the rocket creates an equal but opposite force (or "thrust") that propels the rocket forward in the desired direction. A more common illustration is the toy balloon that is inflated and released. The balloon will careen about the room as the air inside is expelled through the nipple. The air acts as a propellant, just like the fuel in a rocket.

The principle is equally applicable to terrestrial vehicles. In a motorboat, the turning propeller forces water toward the boat's stern, propelling the boat forward. In a jet plane, the jet engine forces air and fuel toward the rear of the plane, creating thrust that moves the plane forward. In a car, the motive force is applied by the friction of a spinning tire on the road surface.

For each mode of transportation, the force or thrust pushing the vehicle forward is the result of an action-reaction force interchange (e.g., propeller against water). Key to this process is the existence of some external mass (such as water, air, road surface or discharging rocket fuel) against which the vehicle may impart a force. As Newton tells us, this force pushes the external mass in one direction, and the vehicle in the opposite direction, thereby propelling the vehicle as desired.

The energy of a moving vehicle such as a car, jet or bicyclist is called "kinetic" energy. Vehicles use on-board engines (such as automobile motors, jet engines, and even the human body) to convert the "potential" energy in fuel (such as gasoline or food) into kinetic energy. Specifically, the consumption of fuel is used to move the engine (often in a rotating direction). The movement of the engine is converted into movement of the vehicle via a prop (in the case of a boat or plane) or drive transmission (in the case of a land vehicle).

Terrestrial Propulsion Problems

On Earth, there is usually no shortage of external mass (such as water, air, or ground) against which a vehicle or other object may be propelled. Nevertheless, there are situations where there is no convenient external mass to provide propulsion. For example, the tip of a very tall tower tends to vibrate and sway (or "oscillate") in an undesirable manner because there is nothing but air to anchor the tip of the tower. The tower tip is in effect a moving body (like a vehicle), whose motion we are interested in stopping. We would like to provide propulsive force in the opposite direction of the tower's movement to stabilize the tower. Conceivably, one could place propellers on opposite sides of the tower, and use the thrust generated by the propeller to stabilize the swaying tower. However, this solution would be expensive, energy-consumptive, and otherwise wholly impractical.

Towers are usually stabilized by using guy wires to anchor the tower tip to the ground. This solution often limits the height of the tower, and, in the case of large towers such as office buildings is not practical or aesthetically acceptable. When guy lines cannot be used, the tower must be built with sufficient strength and rigidity to avoid swaying under normal loads (such as high winds). Unfortunately, earthquakes and other events may impose extraordinary loads on the tower, causing dangerous oscillation and eventually structural failure. Ideally, there would be a practical way of dampening oscillation by applying a motive force to the tower tip in the opposite direction of oscillation.

Extraterrestrial Propulsion Problems

Vehicles in space exhibit three broad classes of motion: oscillatory, rotational and linear. Oscillatory motion is a back and forth or vibratory motion such experienced by large flexible spacecraft undergoing attitudinal correction. Rotational motion is the spinning movement of a body, such as a space station or satellite rotating about its central axis. Linear motion is the straight-line movement of an object traversing between two points in space, such as a rocket accelerating away from the Earth and toward the moon.

Unlike our environment here on Earth, outer space is a vacuum—that is, a place devoid of any mass against which a body could propel itself. For example, an astronaut on a space walk would be unable to move relative to his or her ship if the tether connecting the astronaut were severed. Even with arms flailing and legs kicking, the astronaut could not propel him or herself back to the ship, or even so much as control the direction which he or she was facing. It is impossible to "swim" through space as one does through water because there is no mass in space against which to propel oneself.

Because space is a vacuum, a vehicle that will move through space in a controlled manner must bring along its own external mass in the form of propellant which is discharged to provide moving thrust. The difficulty is, propellant is quickly exhausted, leaving the vehicle adrift without any motive power. This makes space travel over long distances extremely difficult.

For example, a rocket traveling to the moon must bring many tons of propellant to both accelerate away from earth and decelerate upon arriving at the moon. Without propellant, the rocket is like the helpless, drifting astronaut discussed above. If there were a way for rockets to propel themselves through space without having to discharge propellant, it would greatly reduce the cost and difficulty of space travel.

Likewise, a satellite orbiting the earth must use tiny retro rockets to change the direction it faces or the manner in which it rotates. When the satellite exhausts its supply of fuel, its orientation can no longer be controlled. When this happens, the satellite is often permanently inoperable.

Because millions of dollars are invested in building and launching the satellites, it would be very valuable if satellite life could be prolonged by developing a way to maneuver the satellite without expelling physical propellant.

A similar situation will arise with proposed space stations. For many years, scientists have theorized that a large space station could be built and placed into orbit around the Earth. To simulate earth's gravity for the benefit of the station's occupants, the station would be rotated about a central axis. The centrifugal force experienced by someone at the peripheral of the rotating station would feel like gravity. The difficulty is, the only known way to set a large body such as a space station into spinning motion about its own axis is by placing retrorockets about the station's perimeter, and directing the rockets' thrust in a direction tangential to the desired arc of rotation. Depending on the weight of the station, this process would consume an exorbitant amount of propellant. Ideally there would be a way to spin a space station without using propellant. Although the cost per pound of payload is expected to go down, it is currently at $5,000 to $10,000. Thus, any technique for reducing the amount of propellant required would provide significant savings.

The sheer size of a space station raises other issues akin to the problem of anchoring a tall tower on earth. The station would likely be constructed using long, thin beams on the order of several hundred yards in length. These beams will be prone to vibration (much like the swaying of a tall tower on earth), which could become severe enough to cause structural failure.

Ideally, there would be a way of dampening the movement of vibrating space station beams. Unfortunately, just as the air on earth cannot practically be used to dampen the movement of a swaying tower tip, space offers nothing to "anchor" the vibrating beams. Theoretically, the beams could be equipped with thousands of tiny retrorockets to exert propulsive forces to counteract beam vibration. This solution would be extremely expensive and would necessitate the use of propellant. What is required is a way of imposing a propulsive force on the beams without requiring the expulsion of propellant.

Existing Inertial Attitude Control Devices

It is in fact currently possible to control the rotation of satellites to some extent without having to expel propellant. In accordance with this technique, a flywheel on board the satellite is rotated or accelerated to change or correct the rotational momentum of the satellite. The difficulty with these existing techniques is that once the flywheel is rotated or accelerated, it cannot be returned to its original orientation or speed without offsetting the first change or correction. Thus, existing devices are of limited use.

SUMMARY OF THE INVENTION

The present invention is a technique for providing a propulsive force to a dynamic body without having to interact with an external mass. This technique is based on an internal exchange of kinetic energy working in concert with the influence of an ancillary force such as gravity to produce a net momentum change in the body. Using the invention, a body may be rotated or propelled through space without having to expel propellant or otherwise resort to an interaction with an external mass. The invention can also be used to dampen a swaying motion or vibration of a body (such as a tall earth-bound tower or a beam in a space station) when there is no convenient external mass to which the body may be anchored.

In one embodiment, the invention provides propulsion in an oscillating system such as a swaying tower, vibrating member of a space station, or a simple swinging pendulum.

In the case of the simple swinging pendulum, the system includes a chamber suspended for oscillation by a tether. Inside the chamber is a ball mass, two spaced-apart solenoids that can be fired on command, and an electric energy source for controlling the solenoids. The solenoids are fixed on the left and right side of the chamber so that each can fire the ball mass toward the other, much like two people playing catch.

Initially, the pendulum system is stationary, with the ball mass resting on the left solenoid. To begin oscillation, the left solenoid launches the ball mass toward the right solenoid. As the ball mass is launched from the left solenoid, a reactive exchange of forces occurs, pushing the ball to the right and the solenoid to the left. Because the solenoid is fixed to the chamber, the result of this force is to swing the whole chamber to the left. The effect is much like a child "pumping" a swing. In physical terms, the movement of the system is caused by shifting the center of gravity.

The pendulum chamber moves leftward and upward until its motion is overcome by the downward force of gravity, which eventually pulls the chamber back rightward toward its initial starting position. As the chamber moves through this half-cycle of oscillation, the ball mass travels as a free body until it collides with the right solenoid.

This initial movement can be thought of as a "seed pulse." One can build momentum onto this seed pulse by further shuttling the ball mass between the left and right solenoids in accordance with the invention.

For example, after the seed pulse, the ball mass will be resting in the right solenoid with the chamber swinging rightward towards its rightmost zenith. To build on the momentum of the seed pulse, the ball mass is launched from the right solenoid just before the chamber reaches its rightmost zenith. The launch of the ball from the right solenoid imposes an action-reaction force interchange that pushes the chamber above the rightmost zenith that it otherwise would have attained.

The speed and trajectory of the ball launch are selected so that the ball mass collides with the left solenoid after the rightmost zenith has been crossed and while the chamber is swinging leftward towards its leftmost zenith. Thus, the second collision with the left solenoid results in a reactive exchange of force wherein the ball mass is brought to rest and the left solenoid (and, as a direct consequence, the entire chamber) is pushed leftward.

Both the launch of the ball from the right solenoid and the collision of the ball with the left solenoid contribute constructively to the momentum of the system. The process can be repeated left-to-right and right-to-left to build the oscillation.

To decelerate the oscillation, a "soft-landing" slowdown sequence is used, whereby the ball mass is shuttled between the solenoids in a manner that dampens the momentum of the swinging pendulum. This slowdown sequence begins just after the chamber has passed its leftmost zenith, and is accelerating rightward. (Starting the slowdown sequence at the left zenith is an arbitrary choice; the sequence could just as easily begin at the right zenith). At that point, the ball mass is launched from the left solenoid toward the right solenoid. As the ball mass is launched from the left solenoid, a reactive exchange of forces occurs, imposing a rightward impulse on the ball mass and a leftward impulse on the chamber. A vectored component of this leftward impulse is in the opposite direction as the chamber's rightward acceleration, and therefore cancels some of the chamber's rightward velocity.

The chamber continues accelerating rightward (under the force of gravity). As the chamber accelerates, the ball mass, now a free floating body, moves toward and eventually collides with the right solenoid. By carefully choosing the speed and trajectory of the ball mass' launch, the collision between the ball mass and the right solenoid occurs at a point in time when the chamber's velocity has just matched that of the right solenoid. Because the velocities of the ball mass and chamber are exactly or substantially equal, their collision results in a virtually reactionless exchange. Consequently, no momentum is transferred to the chamber as a result of the ball's landing on the right solenoid.

The net effect of shuttling the ball mass between the solenoids is to impart an impulse of force which decelerates the swinging pendulum. When the chamber passes its rightmost zenith, the ball mass can be fired from the right solenoid toward the left solenoid in the same manner as described above. The process can be repeated until the pendulum's motion has been diminished to a desired level.

A "hard-landing" slowdown sequence may also be used to decelerate oscillation. The hard-landing slowdown sequence begins after the chamber has reached its leftmost zenith, and is accelerating and moving rightward under the force of gravity. As the chamber passes the "at rest" position of the chamber system, it attains its maximum velocity. Shortly after this point, the ball mass is launched by the left solenoid toward the right solenoid. As the ball mass is launched from the left solenoid, a reactive exchange of forces occurs, pushing the ball to the right and imposing a leftward impulse on the chamber. A vectored component of this leftward impulse is in the opposite direction as the chamber's rightward velocity and therefore cancels some of that velocity.

The chamber continues moving rightward but decelerating under the force of gravity. Eventually the chamber reaches its rightmost zenith and begins accelerating back leftward under the force of gravity. During this period, the ball mass has been moving rightward as a free floating body toward the right actuator. The ball mass then collides hard with the right solenoid, which is moving in the opposite direction as the ball mass. This hard collision results in an action-reaction exchange wherein the momentum of the ball is transferred to the chamber, imposing a rightward impulse on the chamber that cancels a portion of the chamber's leftward velocity.

Unlike the soft-landing sequence, the hard-landing sequence can be used to bring the chamber to a halt. Like the soft-landing sequence, the hard-landing sequence requires judicious timing so that the ball mass collides with the right (left) actuator after the rightmost (leftmost) zenith of a pendulum system has been obtained. This same hard-landing slowdown process can be used to stabilize the swaying tip of a tall tower or a vibrating member of a space station, as explained below.

In another embodiment, the invention provides rotational propulsion to a rotating system. This embodiment is useful, for example, in adjusting the rotation of a satellite or in rotating a massive space station. In accordance with this embodiment a rotating system or "driver" is attached to the satellite, space station or other primary mass in space which is to be rotated. The driver includes two rigid arms extending radially from opposite sides of the driver. At the distal end of each arm is a chamber much like the chamber described above in connection with the pendulum system. Each distal arm is capable of telescopic-like extension and contraction.

The rotational propulsion begins by coupling the driver to the primary mass and rotating the drive relative to the primary mass using a conventional electromechanical source fixed to the primary mass. As the motor rotates the driver, it causes reactive interaction between the driver and the primary mass, thus imposing a rotational impulse on the primary mass in the opposite direction as the rotation of the driver.

Once the driver has reached a predetermined rotational velocity, it is disengaged from the primary mass leaving both the driver and the primary mass free-wheeling in opposite directions. At this point, the driver may be decelerated in accordance with the invention without expelling propellant or imparting an impulse to the primary mass that offsets the first impulse. Once the driver has been decelerated, it can be recoupled to the primary mass and then reaccelerated using the electromagnetic motor to apply a second rotational impulse to the primary mass. As this process is repeated, the impulses applied to the primary mass build, resulting in substantial rotational acceleration of the primary mass.

The deceleration of the driver is accomplished in accordance with the invention as follows. During each half-revolution of the driver, the radially extending arms each execute a contraction and extension cycle, whereby the spinning chambers are drawn in toward the driver and then meted out away from the driver. Since the driver is in a free-wheeling rotation, its rotation is accelerated when the chambers are drawn in, and decelerated when the chambers are let out.

The chambers connected to the distal end of each arm are comparable in construction to the chamber used with the pendulum system described above, and accordingly include two solenoids and a ball mass shuttled between the solenoids. At the beginning of each half-revolution, the ball mass in each chamber is launched from one actuator to the other so that the ball mass is moving in generally the same direction as the chamber. These launchings impart a reactive force against each chamber in the opposite direction as its rotation, which has the effect of decelerating the driver.

Upon launching, each ball mass coasts through space as a free body toward the opposing solenoid. An instant after the ball mass is launched, the radial arms each contract, drawing their respective chambers closer to the driver, and increasing each chamber's tangential velocity as it rotates about the driver until the velocity of the chamber is equal or close to the velocity of the ball mass.

Through careful launch timing, each chamber reaches this velocity at the same time that its respective ball mass collides with the opposing solenoid. Because the velocity of the ball mass and the opposing solenoid are identical (or at least close) at impact, the collision is reactionless (or nearly so), and does not significantly change the angular momentum of the driver. The effect of shuttling the ball mass from one solenoid to another is a net momentum change that slows down the driver. This process can be repeated every half-rotation of the driver until its angular momentum has been substantially reduced.

BRIEF DESCRIPTION OF THE DRAWINGS

FIG. 8 is a front elevation of an oscillating column system in accordance with the invention.

FIG. 9 is a right side elevation of the column system of FIG. 8.

FIG. 10 is a top plan view of the column system of FIG. 8.

FIG. 11 is a front elevation view of the column system of FIG. 8 in a tensioned position.

DETAILED DESCRIPTION OF THE PREFERRED EMBODIMENT

A. Theory of Transduction

Transduction is a technique for accelerating or decelerating a dynamic system through the action of an internal exchange of kinetic energy in concert with an ancillary force. To illustrate this theory, a simple oscillating system in the form of a pendulum is illustrated in FIGS. 1 through 6.

With transduction, a dynamic system such as a pendulum undergoes a change of velocity due to the influence of an ancillary force (such as gravity or centripetal force) working in concert with a well timed kinetic energy exchange that is internal to the dynamic system. The momentum of the system is changed without interaction with an external mass. Rather, the ancillary force contributes to the net momentum exchange in a transduction system.

Pendulum System

Figure 1A:
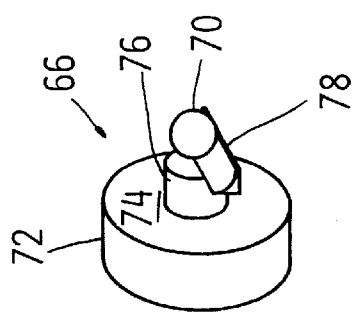
FIG. 1A is an idealized perspective view of a solenoid incorporated in the pendulum system of FIG. 1.
Figure 1:
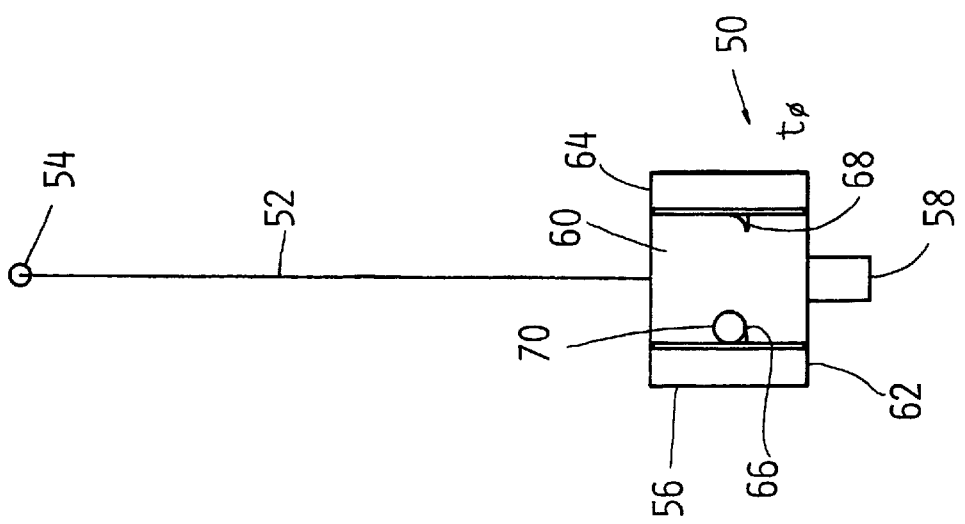
FIG. 1 is an front elevation of a pendulum system in its at-rest position in accordance with the invention.

Referring to FIG. 1, a pendulum system 50 in accordance with the invention as illustrated in its "at rest" position. Pendulum system 50 includes a rigid tether 52, the upper end of which is suspended from a pivot 54. Pivot 54 may be attached to a building or other structure (not shown) as desired. The lower end of tether 52 is pivotedly connected to a box-like chamber 56. Chamber 56 remains level to the ground by suitable means such as a four-bar linkage connecting chamber 56 to tether 52. Ballast 58 is included to assist in leveling chamber 56. Alternatively, more complex leveling systems (such as a gyroscopic stabilizer) may be provided.

Chamber 56 is shown as a simple box-like structure, and may be fully enclosed. For purposes of illustration, Chamber 56 is shown without sidewalls so that its interior 60 is visible. Interior 60 of chamber 56 is defined by two lateral bulwarks 62 and 64 which define the left and right sides of interior 60, respectively. A left solenoid 66 is mounted to bulwark 62, and a right solenoid 68 is mounted to bulwark 64. As explained below, left and right solenoids 66 and 68 are used to shuttle a metallic ball mass 70 back and forth. A free-body ball mass is illustrated here to more clearly illustrate the mechanics of the transduction process. More practical mass shuttling devices are described below.

The construction of solenoids 66 and 68 is illustrated in more detail in FIG. 1A. For clarity, only solenoid 66 is shown, but the solenoids 66 and 68 are substantially identical. Solenoid 66 includes a chassis 72 and having a planar face 74 A retractable cylindrical finger 76 is mounted on face 74, may be extended and contracted in response to a control signal (not shown). Tray 78 extends horizontally from the bottom of retractable finger 76 and is sized and contoured to accommodate ball mass 70. Tray 78 and the front planar face 74 of chassis 72 are metallic and are magnetized to securely hold metallic ball mass 70. By forceful actuation of solenoid finger 76, ball mass 70 resting on tray 78 can be launched toward the opposing side of chamber 56. If desired, magnetization of tray 78 may be accomplished using an electromagnet so that the magnetization may be deactivated at the moment when solenoid finger 76 launches ball mass 70.

Startup Sequence

In the startup sequence, pendulum system 50 is accelerated in accordance with the invention. Just prior to startup sequence at time $t_0$, pendulum system 50 is in the "at rest" position shown in FIG. 1. In this position, pendulum system 50 is motionless and chamber 56 hangs straight down below pivot 54 via tether 52. Ball mass 70 resides in solenoid 66, which is magnetized as described above to securely hold ball mass 70. Finger 76 of solenoid 66 is retracted to accommodate ball mass 70. The choice of placing ball mass 70 in solenoid 66 is arbitrary; the startup process could also begin with ball mass 70 in solenoid 68.

The startup sequence begins by firing finger 76 to launch ball mass 70 off tray 78 of solenoid 66 towards solenoid 68. (The force imparted onto ball mass 70 by finger 76 must also be sufficient to overcome the force of magnetized tray 78). As ball mass 70 is launched from solenoid 66, a reactive exchange of force occurs, pushing ball mass 70 to the right and solenoid 66 (and the remainder of chamber 56) to the left. Ball mass 70 travels as a free-body through interior 60 of chamber 62 and lands on solenoid 68, as shown in FIG. 2.

Figure 2:
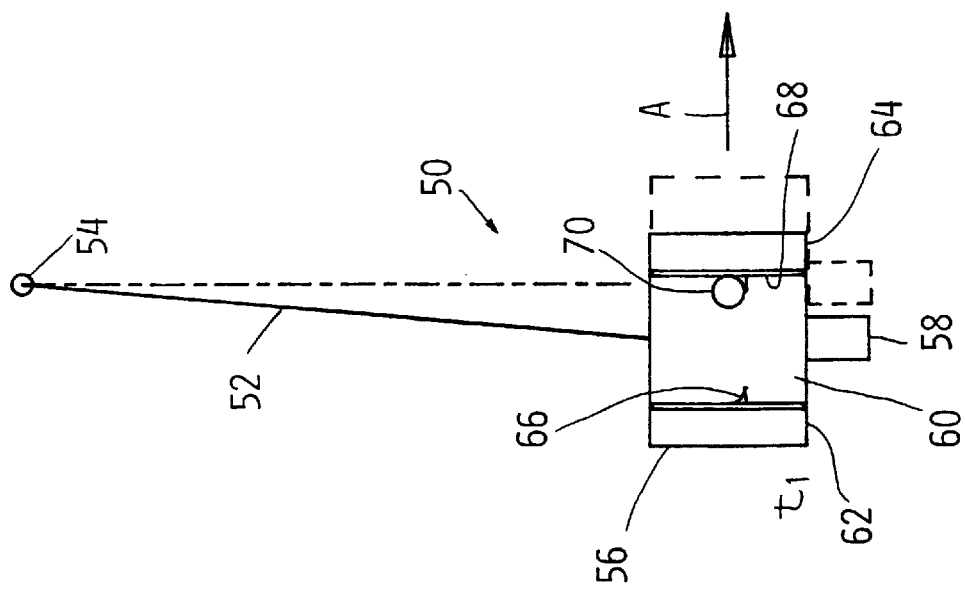
FIG. 2 is the view of the pendulum system of FIG. 1 at a first point in time ($t_1$).

At time $t_1$ (FIG. 2) chamber 56 has reached its leftmost zenith and is returning under the influence of gravity to its "at-rest" position, which is shown in FIG. 2 by dotted lines. Note that ball mass 70 is resting on solenoid 68 by time $t_1$ and chamber 62 is moving in the direction of arrow A.

The shuttling of ball mass 70 from left solenoid 66 to right solenoid 68 causes the chamber 56 to be set into motion. This initial movement can be thought of as a "seed pulse." Further acceleration requires control of the timing and trajectory of ball mass 70, because depending when ball mass 76 is launched from each of solenoids 66 and 68, it can cause either constructive or destructive interference in the motion of pendulum system 50.

The optimum time to actuate solenoid 66 (thus launching ball mass 70 toward solenoid 68) is when chamber 56 is at its leftmost zenith. Likewise the optimum time to actuate solenoid 68 (thus launching ball mass 70 back toward solenoid 66) is when the chamber is at its rightmost zenith. Firing solenoids 66 and 68 at these times contributes constructively to the velocity of chamber 56.

Figure 3:
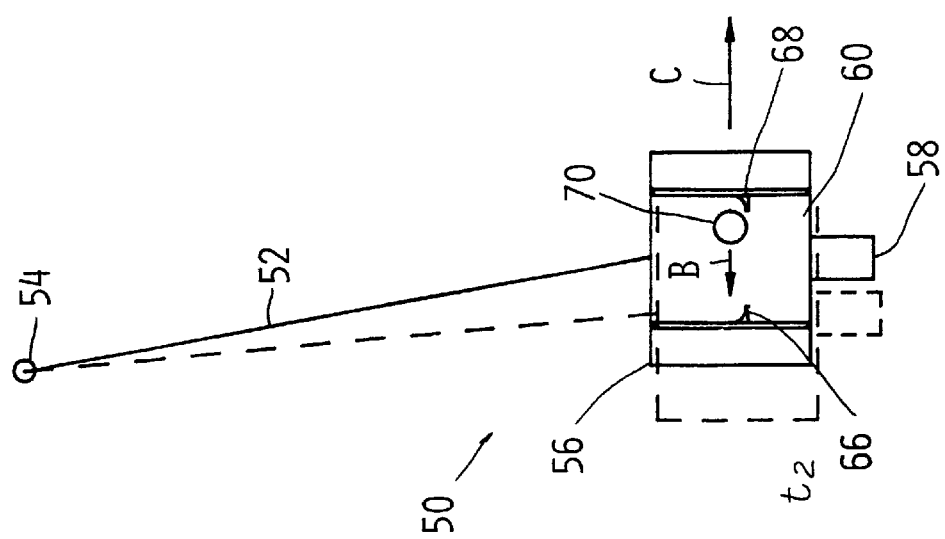
FIG. 3 is the view of the pendulum system of FIG. 1 at a second point in time ($t_2$).

This process is illustrated in FIG. 3 which shows pendulum system 50 at time $t_2$. Since time $t_1$ (illustrated in FIG. 2) pendulum system 50 has swung rightward and is approaching its rightmost zenith position. During the period between time $t_1$ and the point at which pendulum system 50 reaches its rightmost zenith, ball mass 70 resides in actuator 68. When pendulum system 50 reaches its rightmost zenith, actuator 68 is fired to launch ball mass 70 leftward toward actuator 66 in the direction of arrow B. Time $t_2$ as shown in FIG. 3 represents a point just after ball mass 70 has been launched from actuator 68. The launching is a reactive exchange of force between ball mass 70 and actuator 68 which results in chamber 56 being accelerated rightward in the direction of arrow C. Thus, as shown in FIG. 3, the trajectory of chamber 56 is extended beyond the zenith (shown in dotted lines) that it would have acquired, but for the action-reaction interchange caused by launching ball mass 70 from actuator 68 between times $t_1$ and $t_2$.

Figure 4:
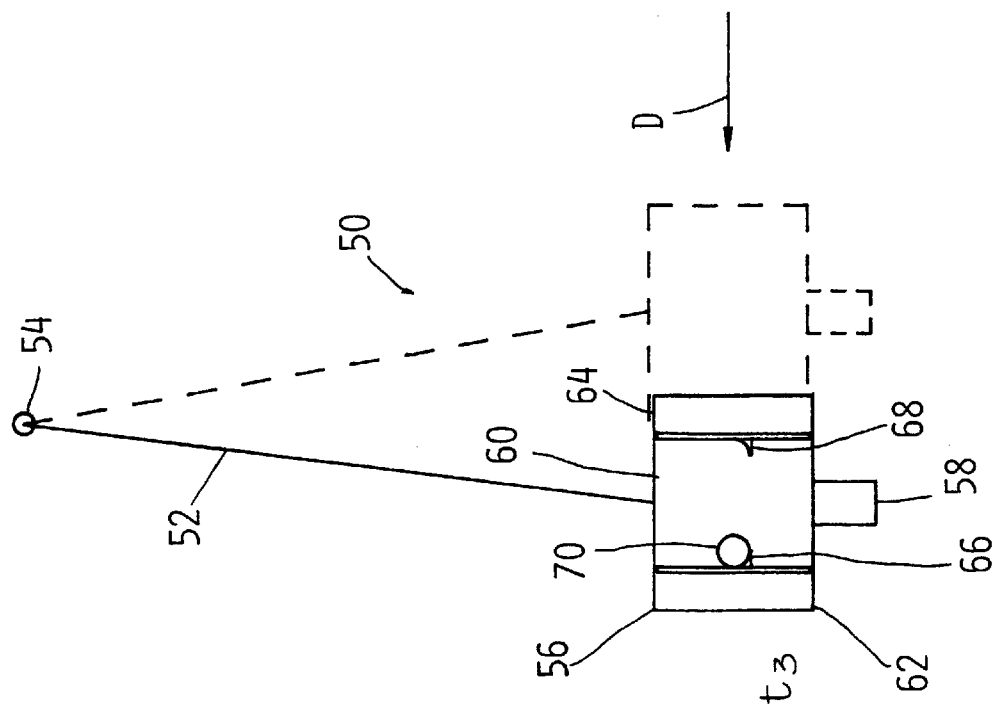
FIG. 4 is the view of the pendulum system of FIG. 1 at a third point in time ($t_3$).

Ball mass 70 having been launched from solenoid 68 traverses the interior 60 of chamber 56 as a free body until it collides with left solenoid 66 at time $t_3$, as shown in FIG. 4. At time $t_3$, chamber 56 is moving leftward in the direction of arrow D, so that the collision of ball mass 70 and actuator 66 results in a net momentum transfer that increases the leftward velocity of chamber 56. In FIG. 4, the position of chamber 56 at time $t_2$ is shown by dotted lines. Referring to FIGS. 3 and 4, it be seen that both the launching and the landing of ball mass 70 contributes constructively to the velocity of chamber 56. The sequence described FIGS. 3 and 4 can be repeated indefinitely, firing ball mass 70 from both solenoid 66 and solenoid 68 to increase the kinetic energy of pendulum system 50.

Soft-Landing Slowdown Sequence

The process of shuttling ball mass 70 between solenoids 66 and 68 can also be used to decelerate the motion of pendulum system 50. There are at least two modes of deceleration—soft-landing and hard-landing, described in FIGS. 5 and 6A–6C respectively.

Figure 5:
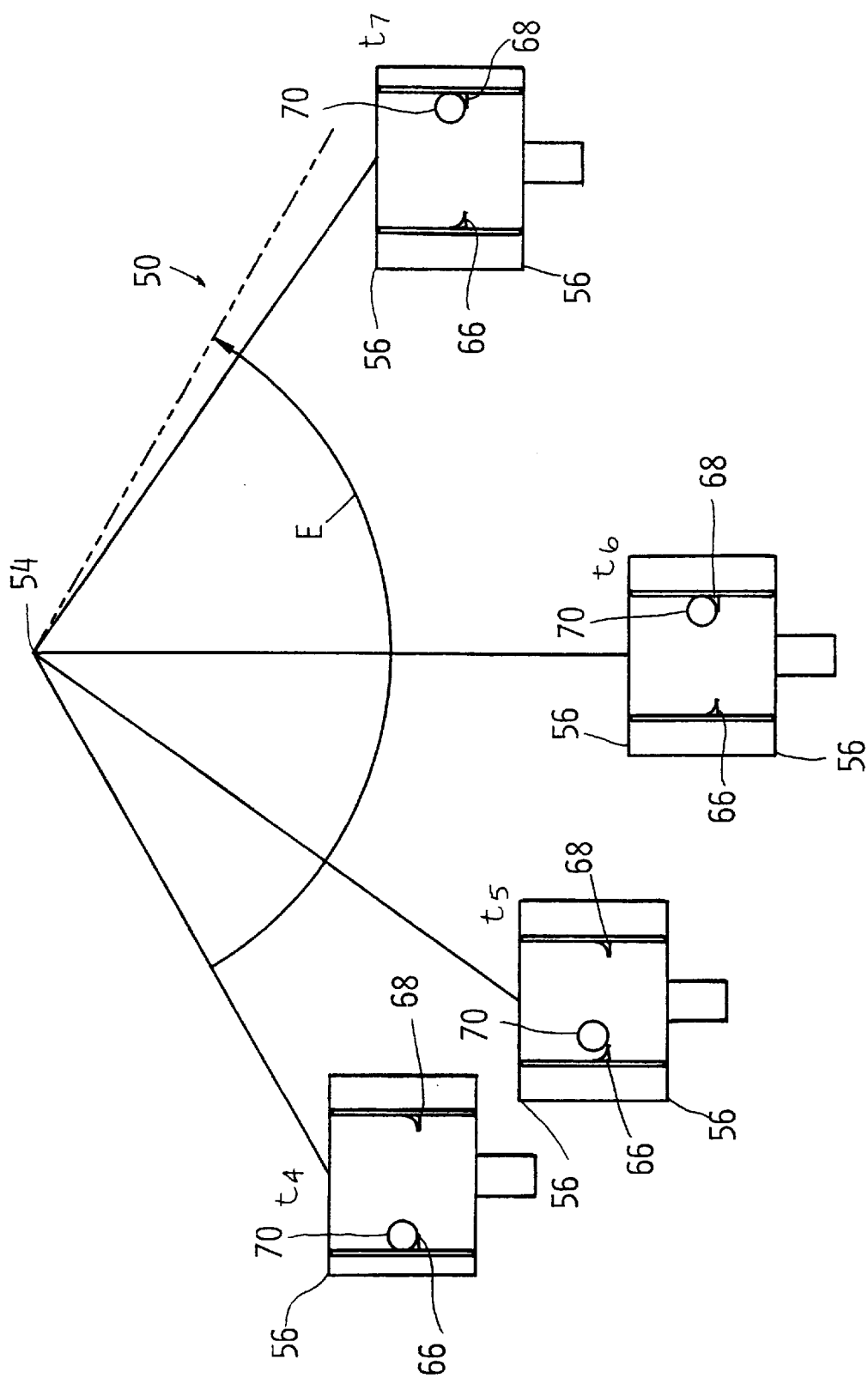
FIG. 5 is an idealized time-lapsed view of the pendulum system of FIG. 1, showing deceleration of the pendulum system in accordance with the soft-landing technique of the invention at times $t_4$–$t_7$.

Referring to FIG. 5, the soft-landing sequence is illustrated in a time-lapsed diagram showing pendulum system 50 at times $t_4$, $t_5$, $t_6$, and $t_7$. Beginning at time $t_4$, pendulum system 50 is at its leftmost zenith with ball mass 70 resting on solenoid 66. Under the influence of gravity, pendulum system 50 is swinging from left to right in the direction indicated by arrow E. Just as chamber 56 begins its rightward and downward movement, solenoid 66 is actuated to launch ball mass 70 toward solenoid 68.

At time $t_5$ (as shown in FIG. 5) ball mass 70 has been launched from solenoid 66 and is moving as a free-body towards solenoid 68. As a result of launching ball mass 70 from solenoid 66, an action-reaction force interchange has occurred which applies a force against chamber 56 in the opposite direction of its rightward movement, thus canceling a portion of the velocity of chamber 56. Chamber 56 continues its rightward swing, gaining velocity under the influence of gravity until time $t_6$, when chamber 56 reaches its lowermost position.

At time $t_6$ chamber 56 has attained its maximum velocity and is under no further acceleration by gravity. Ball mass 70 has traveled across the interior 60 of chamber 56 as a free body subject only to the influence of gravity and the horizontal velocity imparted to it when it was launched from solenoid 66 just after time $t_4$. At time $t_6$, ball mass 70 collides with solenoid 68. However, since chamber 56 has accelerated since time $t_5$ (under the influence of gravity), the velocities of ball mass 70 and solenoid 68 are the same (or at least closely matched). As a result, the collision of ball mass 70 and solenoid 68 results in no or little action-reaction force interchange. Hence, this deceleration technique is referred to as "soft-landing", because ball mass 70 literally has a soft-landing on the solenoid 68. The overall effect of launching ball mass 70 from solenoid 66 (shortly after time $t_4$) and the collision ball mass 70 on solenoid 68 at time $t_6$ is that some of the velocity which chamber 56 would have otherwise had at time $t_6$ is canceled.

At time $t_7$ chamber 56 reaches its leftmost zenith. The dotted line shown in FIG. 5 illustrates the zenith that chamber 56 would have had attained but the reduction of velocity caused by the launch and soft-landing of ball mass 70 between time $t_4$ and $t_6$. As can be seen, the oscillation of chamber 56 has been dampened.

This same process can be repeated, with each half-cycle of pendulum system 50, resulting in a continuing decrease in the kinetic energy of pendulum system 50. To effectuate the soft-landing deceleration, ball mass 70 should be fired as chamber 56 is accelerating (under the influence of gravity) toward its lowermost position. It is also helpful that the speed and trajectory of ball mass 70 be such that ball mass 70 collides with the opposite solenoid 66 or 68 (as the case may be) just as chamber 56 reaches its lowermost position. This allows for velocity matching between the ball mass 70 and the chamber 56, resulting in a collision that has no or at least minimal action-reaction force interchange. Techniques for optimizing launched time and velocity are discussed below.

Hard-Landing Slow Down Sequence

Figure 6A:
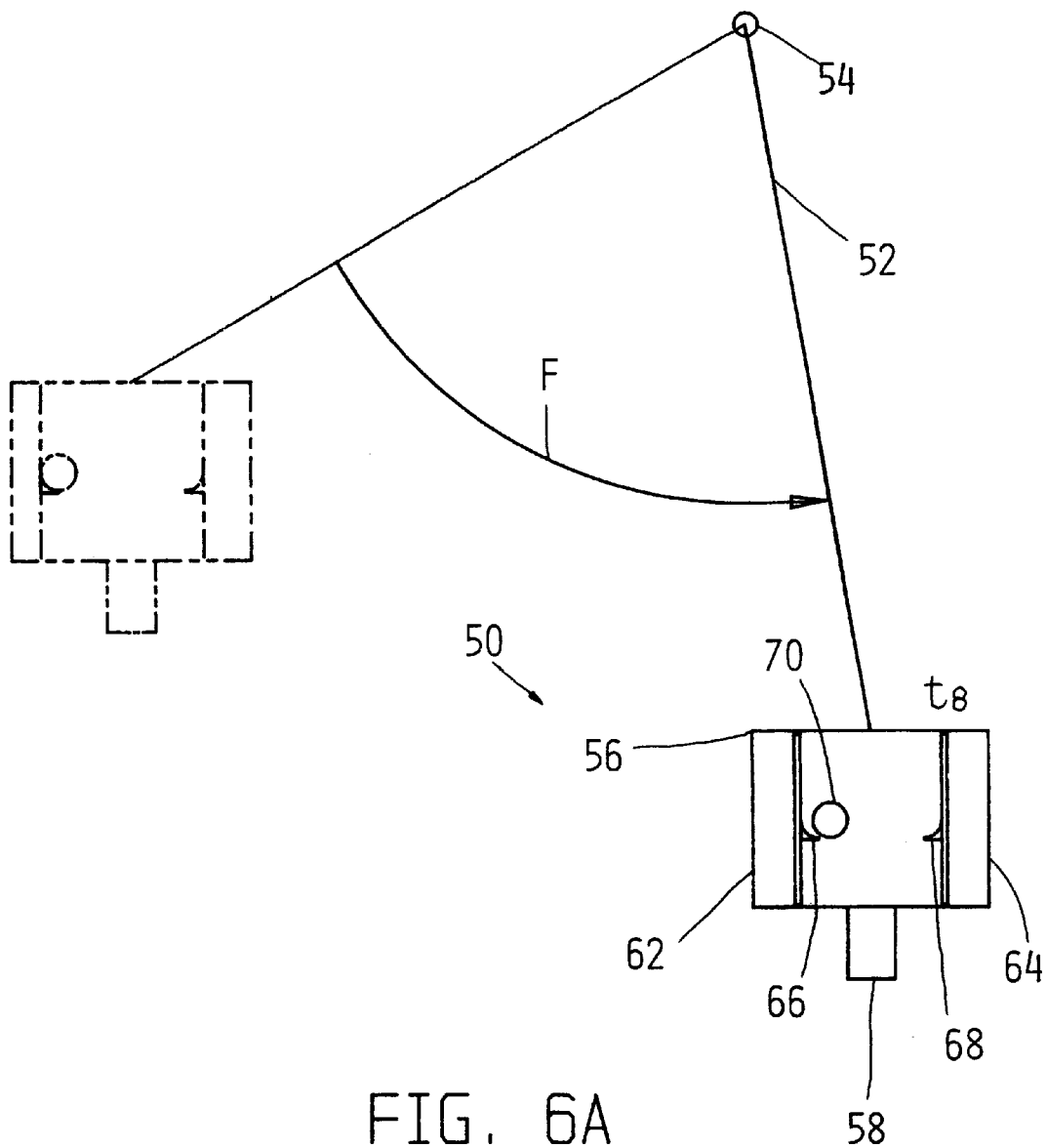
FIG. 6A is a front elevation view of the pendulum system of FIG. 1 at a first point in time ($t_8$) showing deceleration of the pendulum system in accordance with the hard-landing technique of the invention.
Figure 6B:
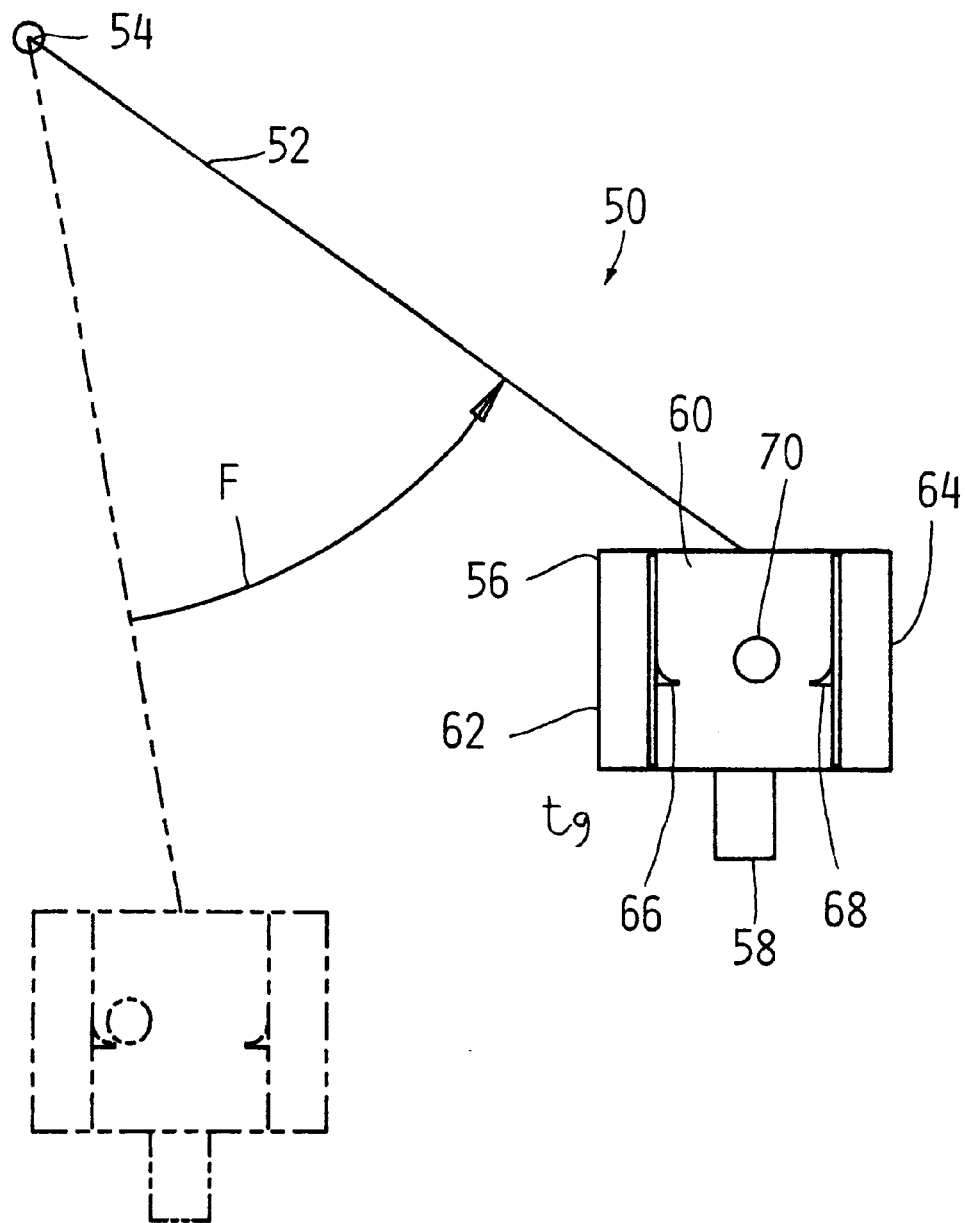
FIG. 6B is a front elevation view of the pendulum system of FIG. 1 at a second point in time ($t_9$) showing deceleration of the pendulum system in accordance with the hard-landing technique of the invention.
Figure 6C:
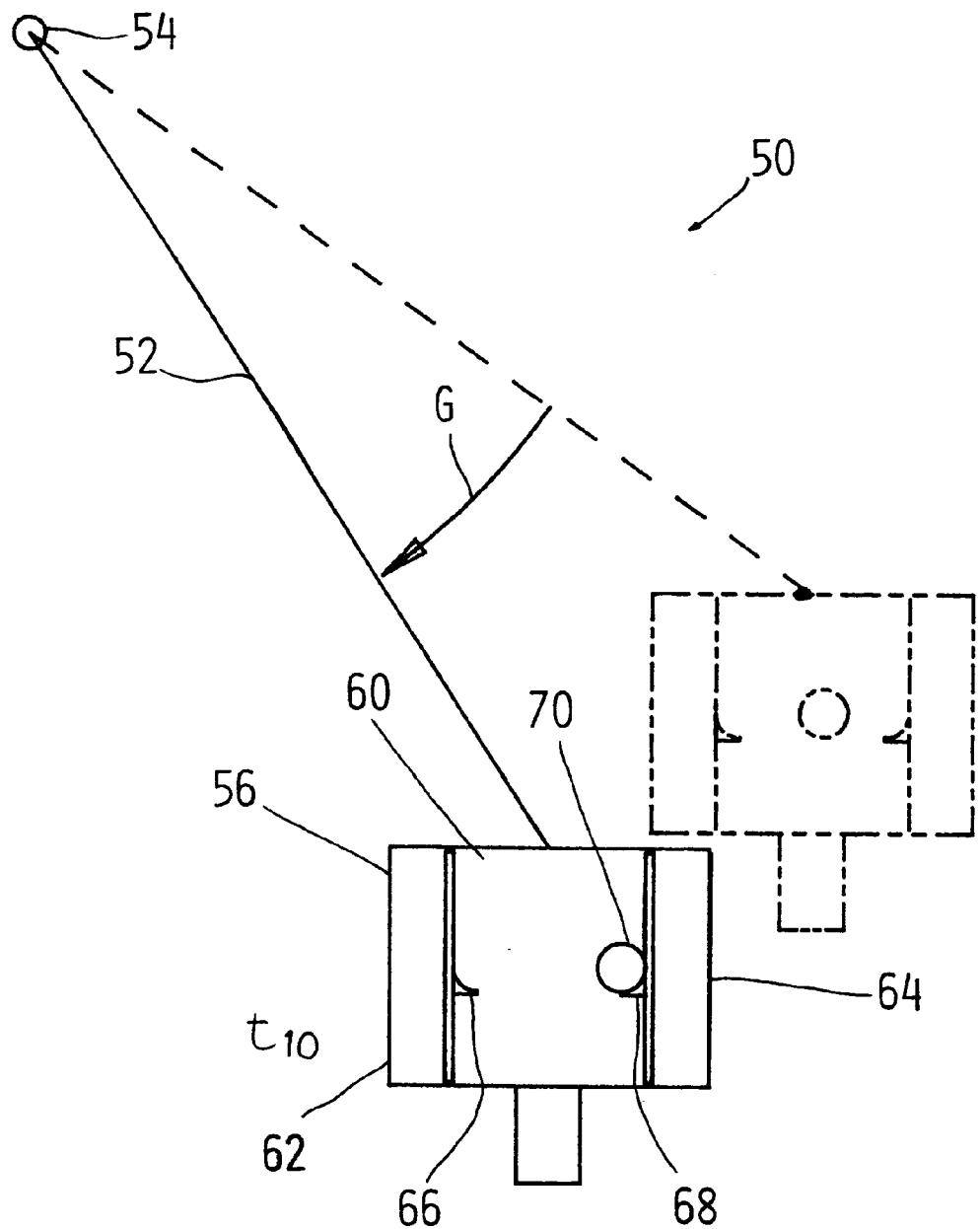
FIG. 6C is a front elevation of the pendulum system of FIG. 1 at a third point in time ($t_{10}$) showing deceleration of the pendulum system in accordance with the hard-landing technique of the invention.

Referring to FIGS. 6A–6C, the hard-landing sequence is illustrated by means of time-lapsed diagrams showing pendulum system 50 at times $t_8$, $t_9$ and $t_{10}$. Like the soft-landing sequence, the hard-landing sequence is a procedure for decelerating the pendulum system 50. Referring to FIG. 6A, the hard-landing sequence begins with chamber 56 at its leftmost zenith (shown in phantom lines), and ball mass 70 resting in solenoid 66. Under the influence of gravity, chamber 56 begins to fall in the direction shown by arrow F, with its rightward and downward velocities accelerating. At $t_8$ chamber 56 has crossed it lowermost "at rest" position, and has just begun the upswing side of its cycle, where it is subject to deceleration by gravity. At time $t_8$, ball mass 70 is then launched from solenoid 66 toward solenoid 68, as shown in FIG. 6A. The launching of ball mass 70 results in an action-reaction force interchange which imposes a force on chamber 56 that supplements the decelerating effects of gravity and cancels some of the rightward velocity of chamber 56.

Referring to FIG. 6B, at time $t_9$ chamber 56 has reached its rightmost zenith (the previous position of chamber 56 at time $t_8$ is shown in phantom lines in FIG. 6B). This rightmost zenith is lower than the zenith that chamber 56 would have obtained but for the force interchange caused by launching ball mass 70 from solenoid 66 at time $t_8$. At time $t_9$ ball mass 70 is still a free body moving through interior 60 on a trajectory toward solenoid 68.

Referring to FIG. 6C, at time $t_{10}$, chamber 56 is returning leftward and in the direction of arrow G and is accelerating under the influence of gravity towards its lowermost "at rest" position. At this time, ball mass 70 collides with solenoid 68. The position of chamber 56 of previous time $t_9$ is shown in phantom lines in FIG. 6C. Unlike the soft landing described above, the collision of FIG. 6C is a hard-landing because ball mass 70 and solenoid 68 are moving in opposite directions at the point of impact, resulting in an action-reaction force interchange which brings ball mass 70 to rest on solenoid 68 and imparts a rightward force on chamber 56 that cancels some of the leftward velocity of chamber 56. The hard landing sequence is much more effective that the soft landing sequence in decelerating the pendulum because there are two (as opposed to one) force action-reaction interchanges that cancel a portion of the pendulum's velocity (that is, launch and collision). This hard landing sequence can be repeated at each half cycle of pendulum system 50, resulting in quick deceleration of chamber 56.

With the hard landing sequence, ball mass 70 should ideally be launched after chamber 56 has passed through its lowermost position and is moving upward against the influence of gravity. The launching of ball mass 70 should be timed so that chamber 56 is able to reach its zenith and begin falling back toward its lowermost position while ball mass 70 is still a free-body moving through interior 60. This timing relationship ensures that ball mass 70 will have a hard collision against solenoid 66 or 68, as the case may be.

Control Circuit

To operate pendulum system 50 in accordance with the invention, it is helpful to provide a control signal to actuate left and right solenoids 66 and 68 to launch ball mass 70 at the proper time. As explained above, during the start-up phase shown in FIGS. 1 through 4, the optimal time for launching ball mass 70 is just as chamber 50 reaches its zenith. During the soft landing sequence shown in FIG. 5, the optimal time for launching ball mass 70 is as chamber 56 is accelerating down toward its lowermost position. During the hard landing sequence, the optimal time to launch ball mass 70 is as chamber 56 is moving toward its zenith.

Thus, a control circuit for implementing the invention has a sensor to detect the position, direction and velocity of chamber system 50 and a circuit for selectively actuating either solenoid 66 or 68 in response to the sensor. It will be apparent to those skilled in the art that there are multiple ways of accomplishing this objective. One suitable control circuit is shown in FIGS. 7.

Figure 7:
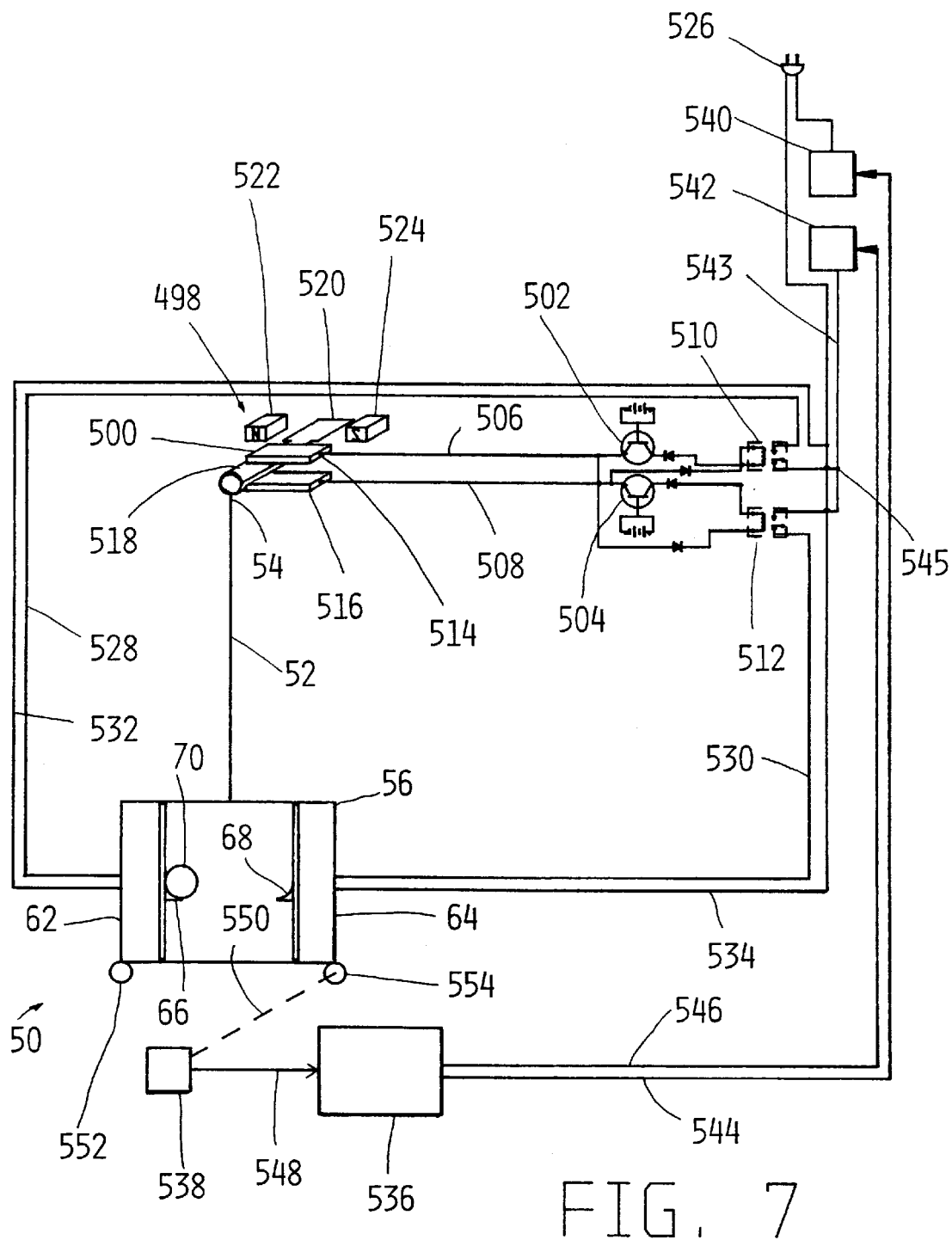
FIG. 7 is a schematic diagram of a control circuit for controlling the pendulum system of FIG. 1.

Referring to FIG. 7, a control circuit for the start-up sequence of FIGS. 1 through 4 is illustrated. FIG. 7 is a hybrid drawing illustrating mechanical and electromechanical elements as well as analog and digital circuitry. The analog elements are shown in conventional schematic symbols. The digital elements are shown in black diagram format. The circuit consists of a motion detector 500, a pair of transistors 502 and 504 coupled to motion detector 500 via lines 506 and 508 respectively and a pair of relays 510 and 512 driven by transistors 502 and 504 respectively.

Motion detector 500 senses when pendulum system 56 has reached its left or right zenith. Motion detector 500 includes a pair of planar brushings 514 and 516 and a cylindrical rod 518 mechanically coupled to pivot 54 and rollalby sandwiched between planar brushings 514 and 516. As pendulum system 56 swings left and right, pivot 54 rotates causing cylindrical rod 518 to also rotate. A wire coil 520 extends from rod 518. North and south magnetic poles 522 and 524 are disposed of either side of coil 520. Thus, as pendulum system 56 swings and rotates cylinder 518, coil 520 is rotated in either a clockwise or counter clockwise direction between magnetic poles 522 and 524. In effect, motion detector 500 is an electric generator driven by the motion of swinging pendulum system 56. A tiny current is generated through lines 506 and 508 by this motion. The polarity of the current through lines 506 and 508 depends on whether coil 520 is being rotated in a clockwise or counter-clockwise direction. It will be observed that this polarity will change abruptly when pendulum system 56 reaches its left or right zenith and begins traveling in the opposite direction. It should be realized that motion detector 500 is shown here for teaching purposes. In practice, more robust commercially available motion sensors should be used.

Leads 506 and 508 are coupled to transistors 502 and 504 respectively. Depending on the polarity of the current through leads 506 and 508, one of transistors 502 or 504 will be activated. Transistors 502 and 504 are coupled to relays 510 and 512, respectively. Each of relays 510 and 512 is coupled to a power supply 526. Relay 510 is also coupled to solenoid 66 via a line 528 and relay 512 is coupled to solenoid 68 via a line 530. Solenoid 66 is also coupled to power supply 526 by a second line 532 and solenoid 68 is also coupled to power supply 526 by a second line 534.

If transistor 502 is activated, current flows through relay 510 actuating relay 510 and closing the circuit between power supply 526 and solenoid 66 (via line 528). If transistor 504 is activated, then current flows to relay 512, actuating relay 512 and closing the circuit between power supply 526 and solenoid 68 (via line 530). When solenoids 66 and 68 are energized by current from power supply 526, retractable finger 76 overcomes its internal spring bias and is extended thereby launching ball mass 70.

Thus, when coil 520 is rotated in one direction, the induced current through lines 506 and 508 flows in a given direction and when coil 520 is rotated in the opposite direction, the induced current through lines 506 and 508 flows in the opposite direction. A current in the first direction activates transistor 502 causing solenoid 66 to be actuated and a current in the second direction activates transistor 504, causing solenoid 68 to be actuated. The coil 520 should be orientated so that it induces maximum voltage when pendulum system 56 crosses its "at rest" position for the purpose of ensuring that the control circuit receives strong and consistent signals. The system as described above must be calibrated so that solenoid 66 is actuated when pendulum system 56 reaches its leftmost zenith and solenoid 68 is actuated when pendulum system reaches its rightmost zenith.

A microcontroller 536 (or other suitable control device) is used for the soft- and hard-landing sequences of FIGS. 5 and 6. Microcontroller 536 works in concert with a digital proximity sensor 538, relay 540 and digitably-controllable potentiometer 542. As mentioned above, these digital elements are depicted in FIG. 7 in block-diagram fashion. Microcontroller 536 is coupled to relay 540 via control signal 544, is coupled to potentiometer 542 via control signal 546, and is coupled to proximity sensor 538 via input signal 548.

Proximity sensor 538 detects the passing of pendulum system 56 by casting a beam of light 550 onto a pair of reflective disks 552 and 554 which are mounted to the bottom of swinging chamber 56. As each of reflective disks 552 and 554 passes by proximity to proximity sensor 538, beam of light 550 is reflected off of reflective disk 552 or 554 and is received by proximity sensor 538. Proximity sensor 538 generates a pulse on signal 548 when it receives the reflection of beam 550 (that is, when one of reflective disks 552 or 554 passes nearby). Microcontroller 536 detects the pulses on signal 548 and calculates the time interval between these pulses. From this time interval and the known separation of disk 552 and 554, microcontroller 536 calculates the speed of chamber assembly 56. Proximity indicator 538 should be located near the "at rest" position of pendulum system 50. Disks 552 and 554 should be mounted on chamber assembly 56 close enough together so that microcontroller 536 can distinguish between consecutive pulses generated during the same half-cycle swing of pendulum system 50, on one hand, and the trailing and leading pulses from two consecutive half-cycles on the other hand.

Relay 540 and potentiometer 542 are coupled in series between one of the leads of power supply 526 and line 543. Line 543 splits at node 545 to feed relays 510 and 512. As described above, when relay 510 is actuated, it closes the circuit between solenoid 66 and power supply 526 via lines 528 and 543. When relay 512 is actuated, it closes the circuit between solenoid 68 and power supply 526 via lines 530 and 543.

Microcontroller 536 can control the amount of current delivered to solenoids 66 and 68 by adjusting potentiometer 542 via control signal 546. During the start-up sequence described above, potentiometer 542 is left in a fixed setting.

Microcontroller 536 can also control the timing of when current is provided to solenoids 66 and 68. This is accomplished by controlling relay 540 via signal 544. As explained above, relay 540 is coupled in series between power supply 526 and feed line 543. Thus, when relay 540 is open, current cannot flow to either solenoid 66 or 68 (regardless of whether relays 510 and 512 are closed). Thus, by selectively actuating relay 540, microcontroller 536 can control the timing of when current will be provided.

During the start-up phase shown in FIGS. 1–4, the optimal time for launching ball mass 70 is just as chamber 50 reaches its zenith. Directional sensor 500 detects when pendulum system 50 has reaches its zenith by sensing the change in direction of the swing in the manner described above. Directional sensor 500 causes one of relays 510 or 512 to be closed thus energizing the appropriate one of solenoid 66 or 68 to launch ball mass 70. (During the start-up sequence, relay 540 is left in its closed position and potentiometer 542 is left in a fixed position.) In the soft-landing sequence, the optimal time for launching ball mass 70 is launched as pendulum system 50 has begun its downward trajectory toward its lowermost "at-rest" position. A key difference between the start-up sequence and the soft-landing sequence is that the speed and timing at which ball mass 70 is launched depends on the speed of the chamber 56. As explained above, the velocity of ball mass 70 upon landing should be roughly equal to that of chamber 56. Thus, the greater the velocity of chamber 56, the greater the push that solenoid 66 and 68 should impart to ball mass 70 on launching. Also, launch does not occur immediately after the zenith is attained, but rather is delayed to provide optimal timing.

To adjust launch speed, microcontroller 536 detects the velocity of chamber 56 as it passes the "at rest" position using speed indicator 538. It then calculates the appropriate velocity for the next launching of ball mass 70 and controls this launch velocity by adjusting potentiometer 540 via line 544. This calculation can be based on empirical data or computed analytically based on equations describing the harmonic motion of chamber 56. Given a maximum pendulum velocity, one can calculate the pendulum's zenith and the time at which the zenith will be reacted.

For example, referring to FIG. 5, it will be seen that ball mass 70 is launched between $t_4$ and $t_5$. The speed at which ball mass 70 is launched depends on the amount of current fed to solenoid 66 via lines 528 and 532. As explained above, this current is adjustable by potentiometer 540 which is in turn controlled by microcontroller 536. The exact calibration of microcontroller 536 and potentiometer 540 must be determined empirically depending on the specific implementation of the invention that is being developed.

To adjust launch timing, microcontroller 536 leaves relay 540 open (via control signal 545) until the desired launch time (in FIG. 5, this desired launch time occurs between times $t_4$ and $t_5$). When relay 540 is closed, launch occurs. (Note that direction sensor 500 has already selected the proper one of solenoids 66 and 68 to be energized when relay 540 is closed.) The appropriate delay may be derived analytically for a given implementation of the invention based on the launch speed of ball mass 70. The timing of the launch is selected so that, for a given launch speed, ball mass 70 arrives at the "at-rest" position at or near the same time as that one of solenoids 66 or 68 with which it is intended to collide.

During the hard-landing sequence described in FIGS. 6A through 6C a different approach is used. Referring to FIGS. 6B and 6C, it will be recalled that ball mass 70 is launched from solenoid 66 as chamber 56 approaches its rightmost zenith. When chamber 56 reaches its rightmost zenith, ball mass 70 is a free body moving through interior 60 of chamber 56. Ball mass 70 collides with solenoid 68 at $t_{10}$ as chamber 56 is moving downward toward its "at rest" position. Thus, ball mass 70 should be launched from solenoid 66 at a time and at a velocity so that it strikes solenoid 68 after chamber 56 has reached its rightmost zenith. In this manner, ball mass 70 and chamber 56 are moving in opposite directions at the time of collision (hence the name "hard landing" sequence).

To achieve proper launch timing and velocity, microcontroller 536 determines the velocity of chamber 56 as it passes through the "at rest" position using proximity sensor 538 as discussed above. Relay 540 is held in its open position at this time to prevent current from reaching solenoid 66. By determining the velocity of chamber 56 as it passes the "at rest" position, one can calculate the position and arrival time of the upcoming zenith. Ball mass 70 must be launched at a point in time and at a velocity so that chamber 56 has time to reach its zenith before colliding again with ball mass 70.

Ideally, ball mass 70 is launched at full power during the hard landing sequence, so no adjustment to potentiometer 542 is required (that is, potentiometer is left in its maximum current position). Microcontroller 536 need only calculate the desired launch time as a function of speed of pendulum 50 at the "at rest" point. As explained above, the launch time is selected so that pendulum system 50 will reach and pass its zenith while ball mass 70 is a free-body. Depending on the specific implementation of the invention, some empirical calibration of launch speed and timing may be necessary.

B. Oscillating Column System

Configuration

An application of the transduction principles detailed above is shown by an oscillating column system "OCS" 80 illustrated in FIGS. 8–9. Referring to FIG. 8 it will be seen that OCS 80 includes a flexible stalk 82 extending vertically upward from a base 84. Base 84 is mounted on a foundation 86 which may be a building or the earth. Stalk 82 includes an upper end 88 from which extends a horizontal mounting finger 90 as most clearly seen in FIGS. 9 and 10. A chamber system 92 is suspended by a strap 94 from finger 90. Chamber 92 is substantially identical to chamber 56 described in connection with FIGS. 1–4. Referring to FIG. 10, it will be seen that chamber 92 includes a roof 96 to which strap 94 is mounted. Ends of strap 94 are mounted to roof 96 at points 98 and 100, which are spaced apart by a distance of approximately half of the overall length of strap 94. In suspending chamber 92 from finger 90, cable 94 is draped over finger 90. It will be appreciated under this arrangement, chamber 56 tends to remain level. This leveling effect is enhanced by providing ballast 102 at the bottom of chamber 92.

Start Up Sequence

Referring to FIG. 8, chamber 92 includes an interior portion 104 defined by two opposing left and right bulwarks 106 and 108 respectively. Mounted to bulwark 106 is a left solenoid 110 similar in construction to solenoids 66 and 68 discussed above in connection with FIGS. 1–4. Mounted to bulwark 108 is a right solenoid 112, which is similar in construction to solenoid 110. A ball mass 114 is resident in interior 104 and is shuttled back and forth between solenoids 110 and 112 as described below.

Referring to FIG. 11, the resiliency of stalk 82 is illustrated. If the tip of 88 of stalk 82 is bent (for example, by the wind or other loads), stalk 82 imposes a force tending to move tip 88 towards its vertical or "at rest" position shown in FIG. 8 in the direction suggested by the arrow H of FIG. 11. This resiliency makes OCS 80 capable of oscillating in the manner of an upside down pendulum, with the structural resiliency of stalk 82 providing the same type of ancillary force as gravity provides in the pendulum system of FIGS. 1–4.

By shuttling ball mass 114 between solenoids 110 and 112, the upper tip 88 of stalk 82 can be made to oscillate back and forth in pendulum-type fashion. At the same time, if tip 88 is oscillating, the shuttling of ball mass 114 in accordance with the hard landing slowdown sequence described above (in connection with FIGS. 1–4) may be used to stop oscillation of tip 88.

Figure 12:
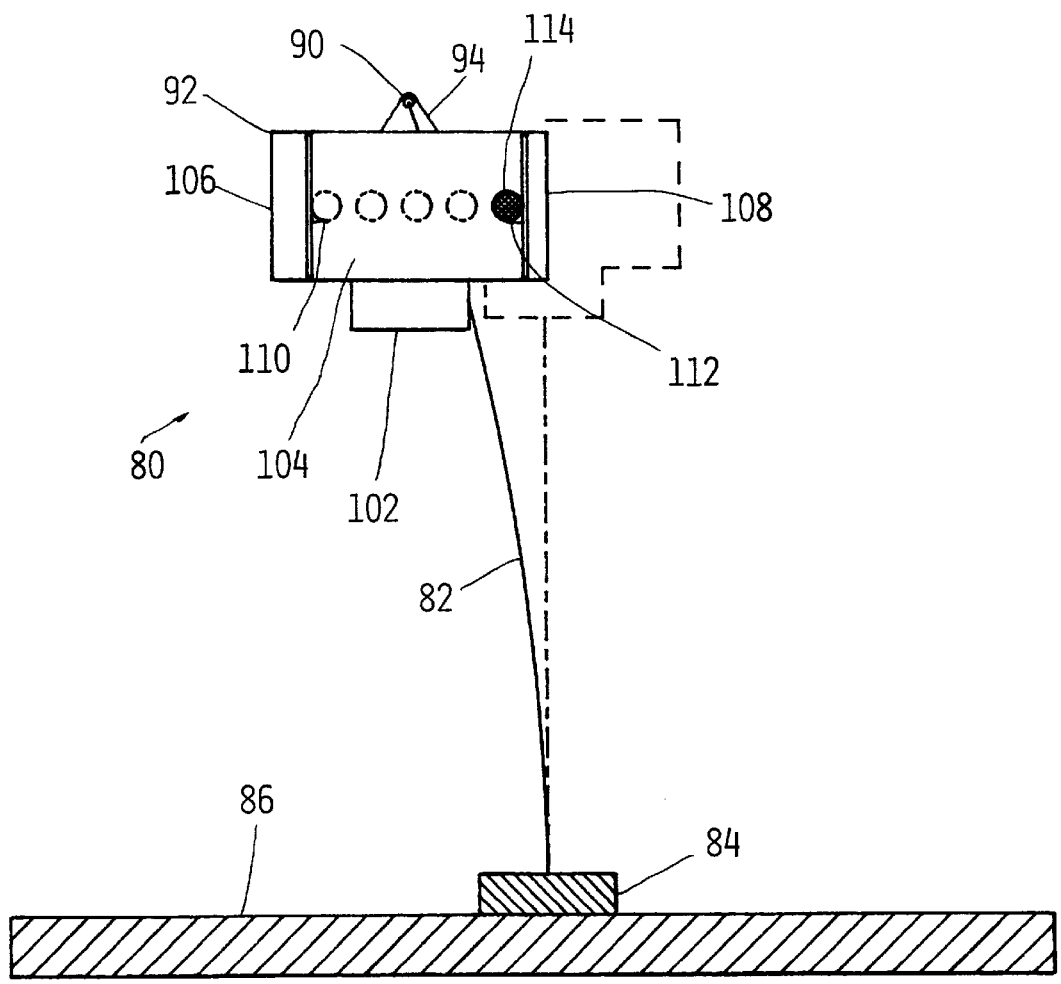
FIG. 12 is an idealized view of the column system of FIG. 8 after its ball mass has been launched from its left solenoid.

Referring again to FIG. 8, the startup sequence begins with OCS 80 in its "at rest" position wherein stalk 82 is vertical, and ball mass 114 is resting in solenoid 110, as shown. At this time, solenoid 110 launches ball mass 114 through interior 104 toward solenoid 112. This launch results in an action-reaction force interchange, which pushes chamber 92 leftward and ball mass 114 rightward, as shown in FIG. 12. The "at-rest" position of OCS 80 is shown in phantom lines in FIG. 12. For clarity, stalk 82 is shown as an idealized line in FIGS. 12–14. This initial movement can be thought of as a "seed pulse" caused by shifting the center of gravity of chamber 92 when ball mass 114 is shuttled to right solenoid 112. As with pendulum system 50, one can build or dampen oscillation of OCS 80 by continued shuttling of ball mass 114 in accordance with the invention.

After the initial seed pulses the resiliency of stalk 82 imposes a rightward force on chamber 92, which checks its leftward velocity and brings chamber 92 back towards the initial "at rest" position.

Figure 13:
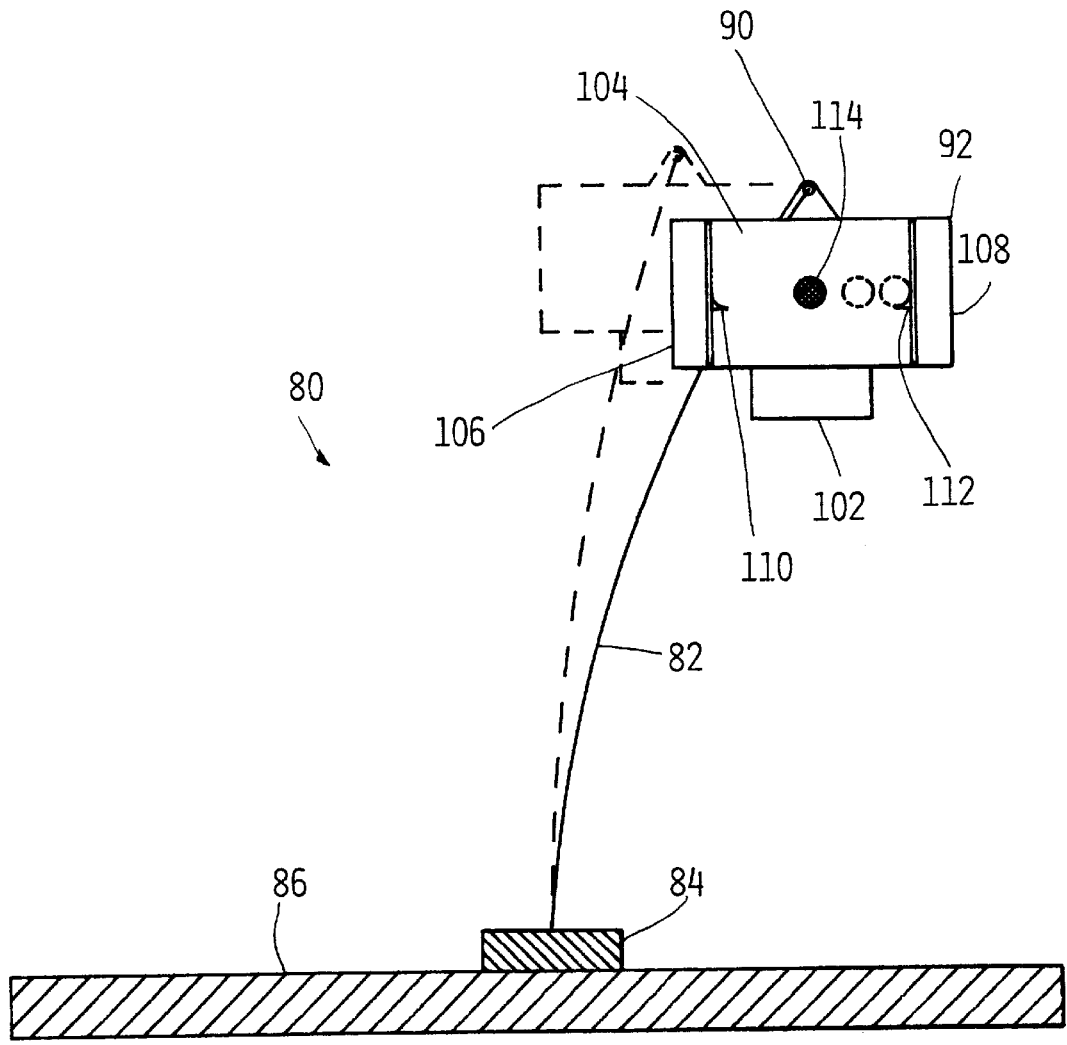
FIG. 13 is an idealized view of the column system of FIG. 8 after its ball mass has been launched from its right solenoid.

The velocity of chamber 92 carries it past the "at rest" position toward its rightmost zenith as shown in FIG. 13. As OCS 80 approaches its rightmost zenith, ball mass 114 is launched from solenoid 108 across interior 104 toward solenoid 110 (as shown in FIG. 13). This launch results in an action-reaction force interchange which pushes chamber 92 farther rightward. A dotted line in FIG. 13 illustrates the rightmost zenith that OCS 80 would have achieved but for the second launch of ball mass 114. The shuttling of ball mass 114 between solenoid 108 and 110 increases the oscillation of OCS 80. The shuttling has added constructively to the oscillation energy by timing the launchings of ball mass 114 in the same manner described above in connection with the pendulum system of FIGS. 1–4.

To maximize the momentum gain, ball mass 114 should be launched from left solenoid 108 as chamber 92 approaches its leftmost zenith, and the speed and trajectory of ball mass 114 should be chosen so that ball mass 114 ideally collides with solenoid 110 after chamber 92 has crossed its zenith and is returning to its "at rest" position. Similarly, ball mass 114 should be launched from right solenoid 112 as chamber 92 reaches its rightmost zenith, and should ideally have a speed and trajectory selected to provide a collision with solenoid 110 which occurs as chamber 92 is returning to its "at rest" position.

Hard-Landing Slow Down Sequence

Figure 14A:
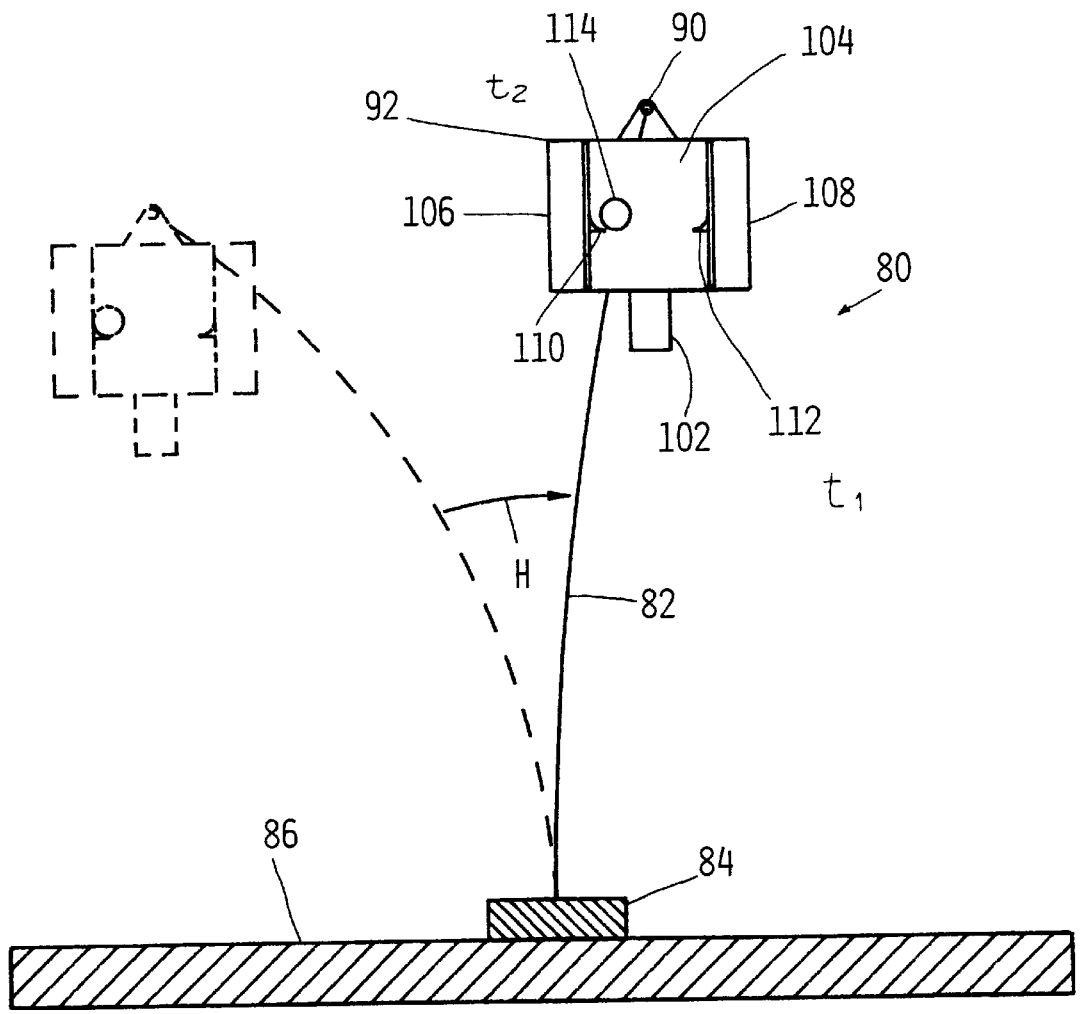
FIG. 14A is an idealized view of the column system of FIG. 8 at a first point in time ($t_1$), showing deceleration in accordance with the hard-landing technique of the invention.
Figure 14B:
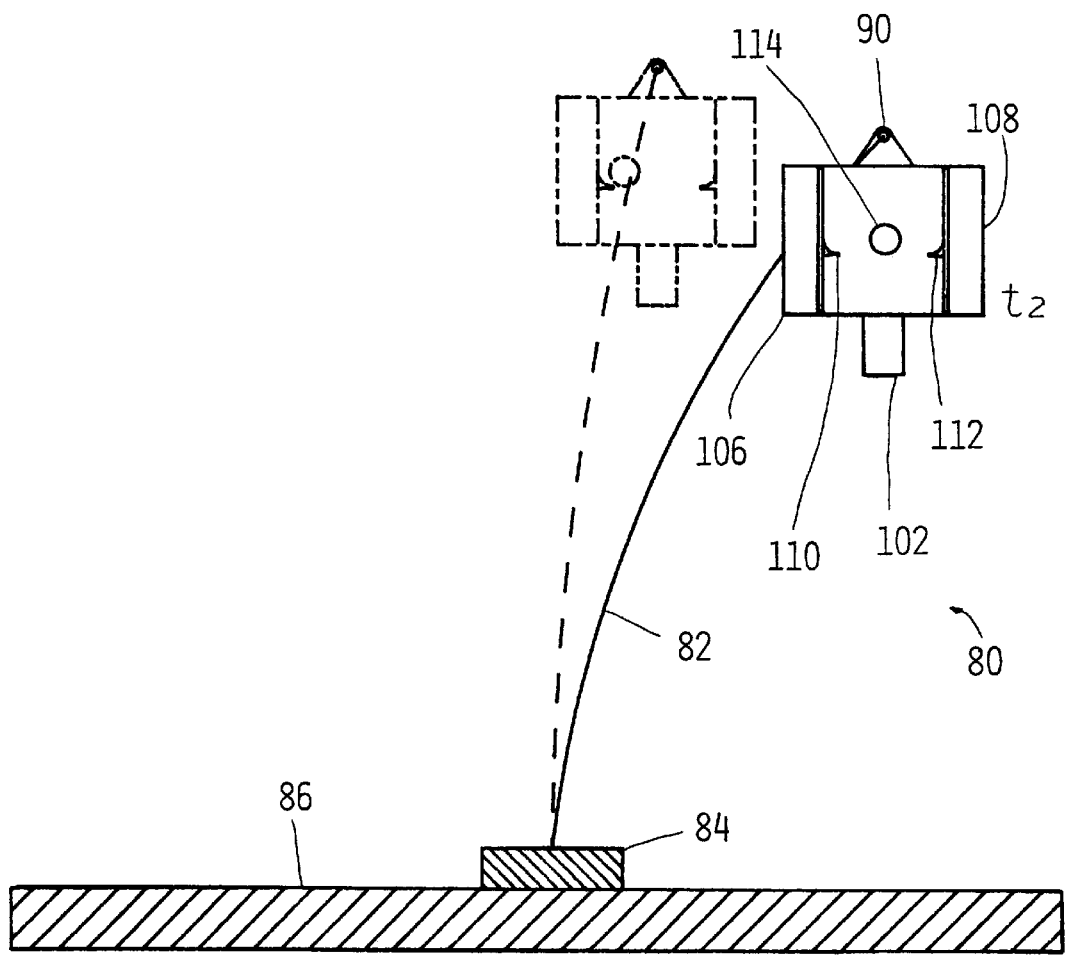
FIG. 14B is an idealized view of the column system of FIG. 8 at a second point in time ($t_2$), showing deceleration in accordance with the hard-landing technique of the invention.
Figure 14C:
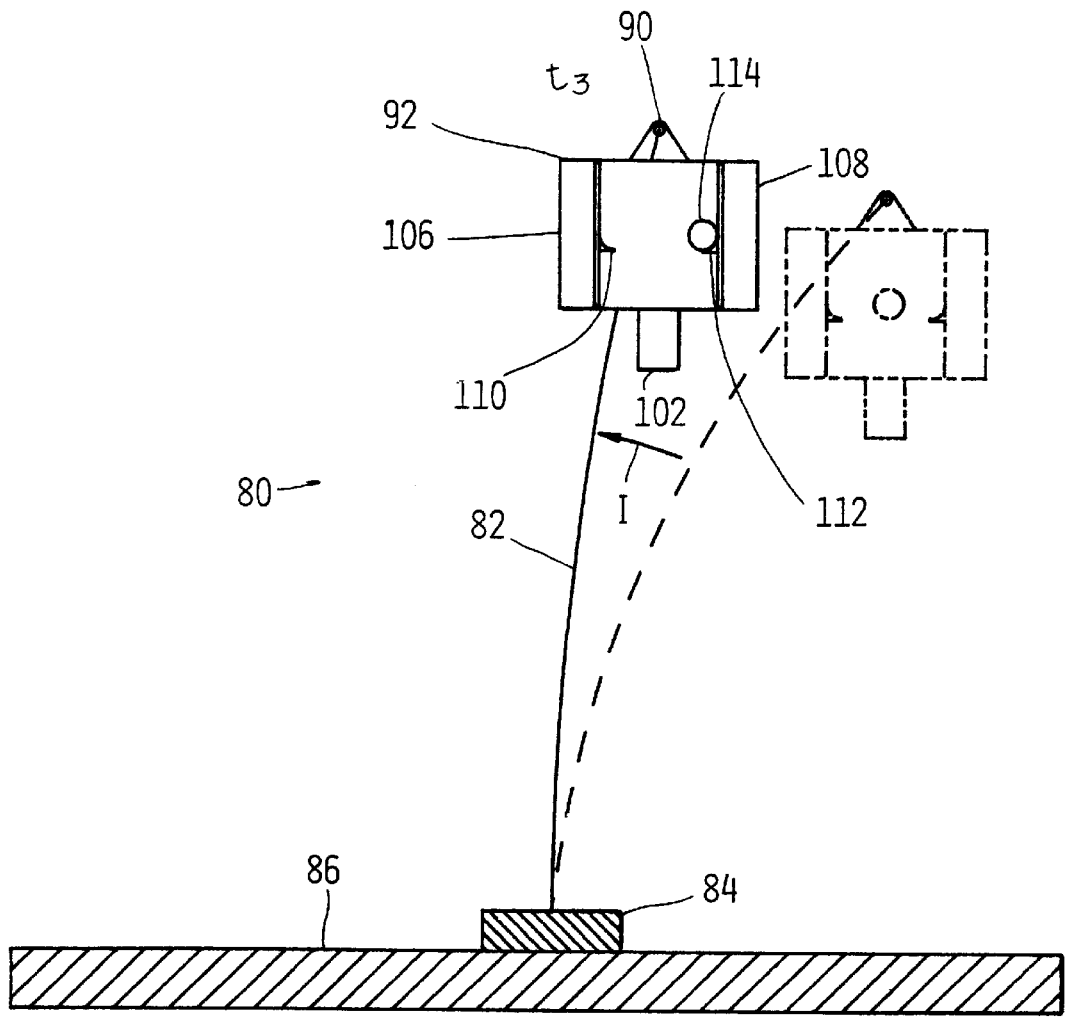
FIG. 14C is an idealized view of the column system of FIG. 8 at a third point in time ($t_3$), showing deceleration in accordance with the hard-landing technique of the invention.

As a practical matter, chamber 92 will not typically be used to start oscillation of OCS 80, but rather will be used to stop undesirable oscillation. Referring to FIGS. 14A–14C, the shuttling of ball mass 114 between solenoids 110 and 112 may be used to effect a "hard-landing" slowdown sequence wherein the oscillation of OCS 80 is brought to a quick halt. FIG. 14A is a time-lapsed view of this sequence at an initial state and a subsequent time $t_1$. Initially, chamber 92 is at its leftmost zenith (shown in phantom lines), and ball mass 114 resides in solenoid 110. The resiliency of stalk 82 imposes a leftward force on chamber 92 casting it upward and rightward in the direction of arrow H toward and past the "at rest" position. At time $t_1$, chamber 92 has crossed the "at rest" position and has attained its maximum velocity as shown in FIG. 14A. The resiliency of stalk 82 is at this time imposing a decelerating force on chamber 92 in the opposite direction of arrow H.

At time $t_1$, ball mass 114 is launched from solenoid 110 towards solenoid 112. This launching results in an action-reaction force interchange that moves ball mass 114 rightward and imposes a leftward force on chamber 92. This leftward force supplements the decelerating force imposed by stalk 82.

Referring to FIG. 14B, chamber 92 continues its rightward trajectory until it reaches it rightmost zenith at time $t_2$. This zenith is short of the zenith that chamber 92 would have obtained but for the reduction in velocity caused by the launching of ball mass 114 at time $t_1$. At time $t_2$, ball mass 114 is still a free body moving through the interior 104 of chamber 92 toward right solenoid 112, as shown in FIG. 14B. The position of chamber 92 at time $t_1$ is shown in phantom lines in FIG. 14B.

Referring to FIG. 14C, at time $t_3$, chamber 92 is returning leftward in the direction of arrow I toward its "at-rest" position and is accelerating under the influence of the resilient force of stalk 82. (The position of chamber 92 at time, $t_2$ is shown in phantom lines in FIG. 14C.) At time $t_3$, ball mass 114 collides with solenoid 112 as shown in FIG. 14C. This collision is a "hard-landing" because ball mass 114 and solenoid 112 are moving in opposite directions, resulting in an action-reaction force interchange which brings ball mass 114 to rest on solenoid 112 and imparts a hard rightward force on chamber 92 that cancels some of its leftward velocity. This hard-landing sequence can be repeated each half cycle of OCS 80, resulting in a quick deceleration of chamber 92.

With the hard-landing sequence, ball mass 114 should ideally be launched after chamber 92 has passed through its "at rest" position and is moving against the influence of the resilient force of stalk 82. The launching of ball mass 114 should be timed so that chamber 92 reaches and passes its left (or right) zenith while ball mass 114 is still a free-falling body moving through the interior 104 of chamber 92. This timing relationship ensures that ball mass 114 will be moving in the opposite direction as chamber 92 when it collides with solenoid 110 (or 112), as the case may be.

Control Circuit

Figure 15:
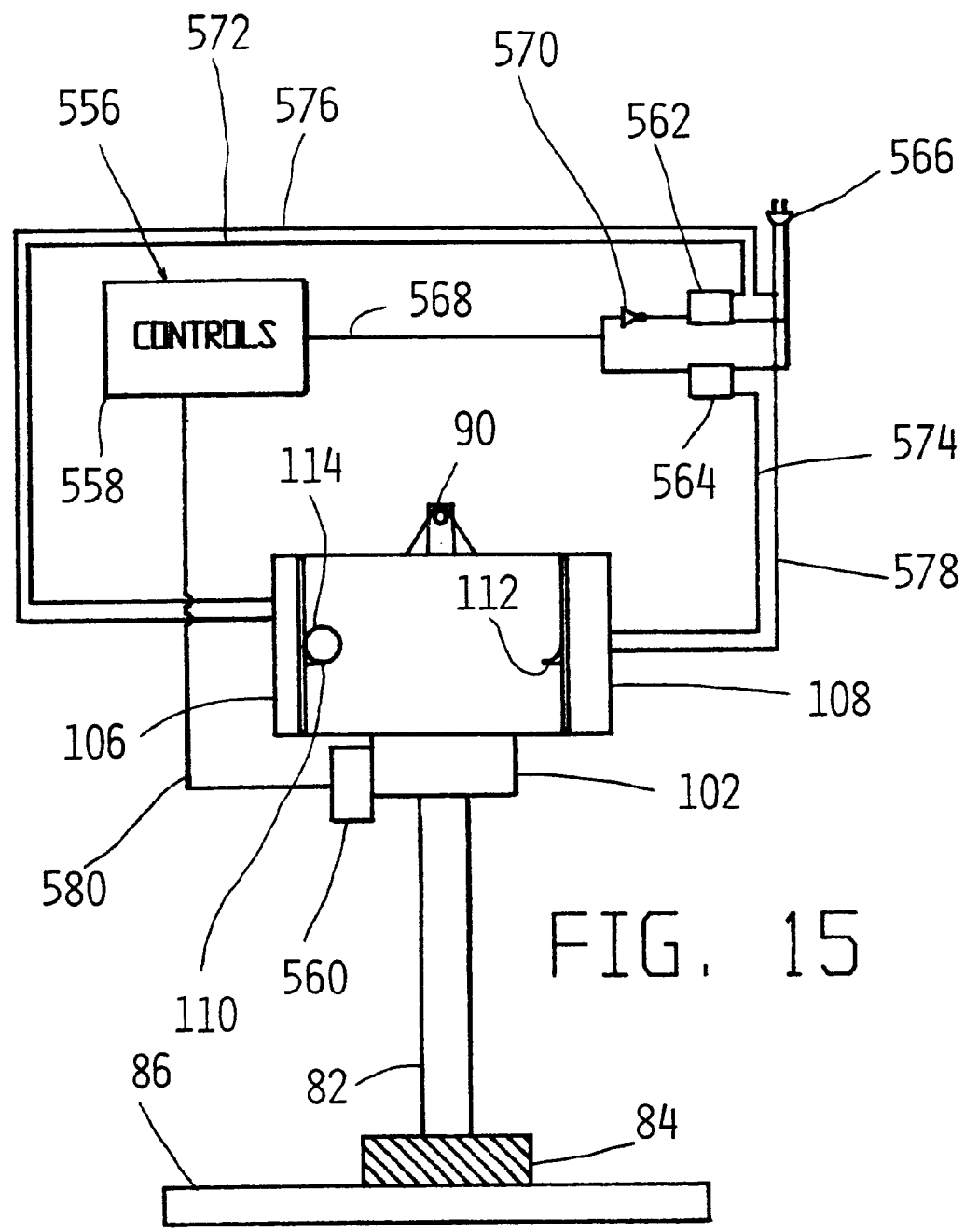
FIG. 15 is a schematic diagram of a control circuit for controlling the column system of FIG. 8

Referring to FIG. 15, a control circuit 556 is shown for controlling the operation of OCS 80 during the hard-landing slow down sequence described above. Control circuit 556 includes a microcontroller of 558 and an accelerometer 560, and two relays 562 and 564 for selectively coupling a power supply 566 to either solenoid 110 or 112. The illustration of FIG. 15 is a hybrid drawing of mechanical, electrical and digital elements. The digital elements are shown in block-diagram format.

Microcontroller 558 controls relays 562 and 564 via a control signal 568 which is coupled directly to relay 564 and via an inverter 570 to relay 562. Relay 562 couples power supply 566 to solenoid 110 via line 572. Relay 564 couples power supply 566 to solenoid 512 via line 574. Solenoids 110 and 112 are also coupled to power supply 566 via lines 576 and 578, respectively, as shown in FIG. 15.

Depending on the value of signal 568, either one or the other (but not both) of relays 562 or 564 will be actuated to close the circuit between power supply 566 and a selected one of solenoids 110 and 112. For example, if microcontroller 558 sets the output of signal 568 from "zero" to "one," the corresponding input of relay 564 will go from "zero" to "one" and the corresponding input of relay 562 will go from "one" to "zero" (because signal 568 is inverted by inverter 570 before reaching relay 562).

The transition from low to high on control signal 568 causes relay 564 to actuate, closing the circuit between power supply 566 and solenoid 112 (via line 574). When solenoid 112 receives power, it is actuated to extend its respective finger and launch ball mass 114. Thus, microcontroller 558 can selectively actuate solenoid 110 or 112 by toggling control signal 588 from low-to-high or from high-to-low.

Accelerometer 560 determines the acceleration of OCS 80 as it sways left and right and repeatedly transmits that information to microcontroller 558 via a sensor signal 580. Microcontroller uses data received from accelerometer 560 to determine when to fire solenoids 110 and 112.

Referring to FIG. 14A, it will be recalled that in connection to the hard landing sequence ball mass 114 is fired from solenoid 110 after chamber 92 passed the "at rest" point and was moving against the resilient force of stalk 82 toward its rightmost zenith. The launching of ball mass 114 is ideally timed so that ball mass 114 collides with the opposite solenoid 112 after chamber 92 has received its right zenith and is returning toward the "at rest" point as shown in FIG. 14C. Microcontroller 558 determines the appropriate time to toggle control signal 568 to launch ball mass 114 by tracking the data provided by accelerometer 560. When chamber 92 crosses the "at rest" position, accelerometer 560 registers a change from acceleration to deceleration. Microcontroller 558 then sums and averages the accelerations from that point forward to determine chamber's 92 location and speed. Using this location and speed data, microcontroller 558 calculates the appropriate time for firing ball mass 114. Depending on specific implementation of the invention, the relationship between speed, position and firing time should be calibrated empirically.

Applications

Figure 16:
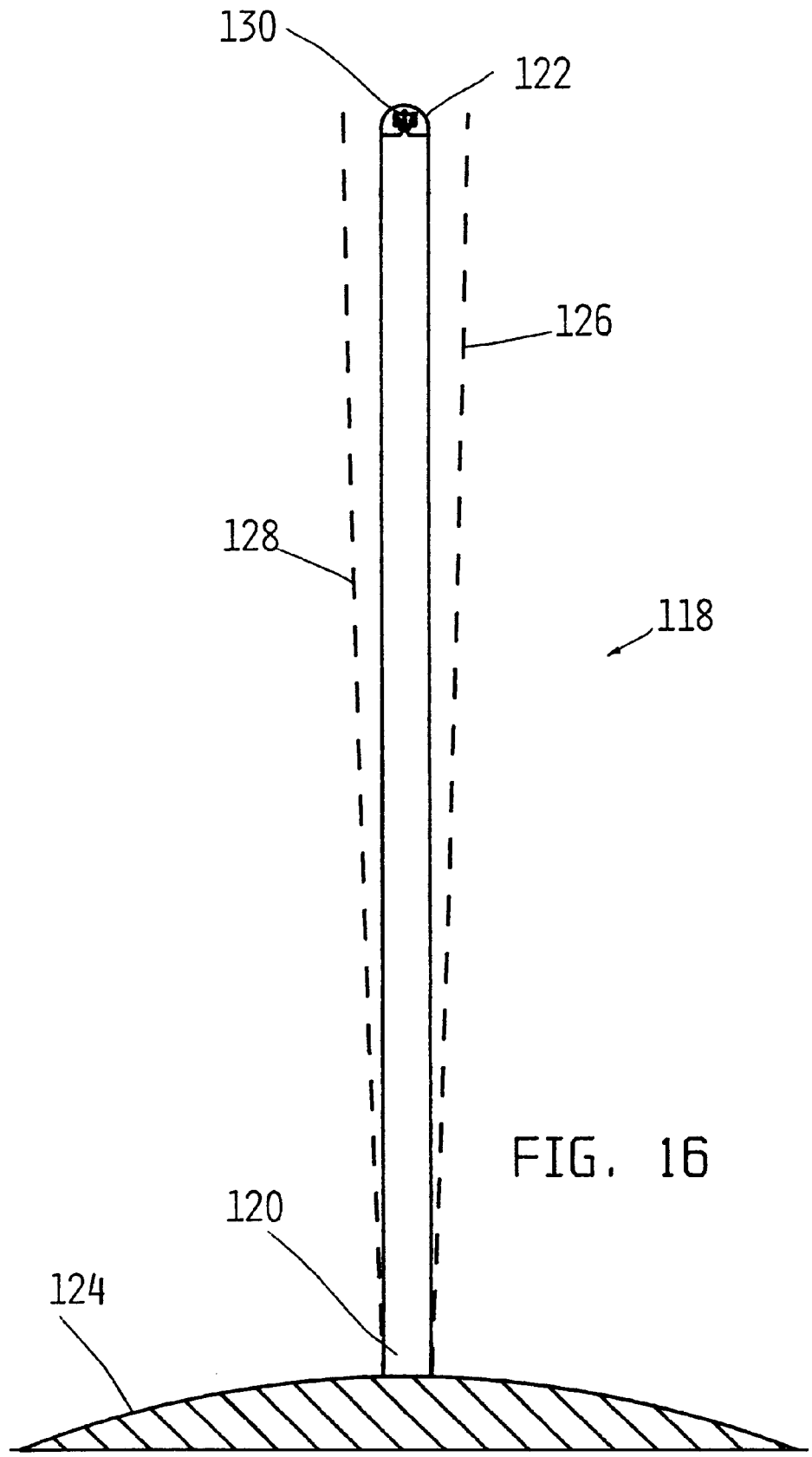
FIG. 16 is an idealized front elevation view of a guyless tower that is stabilized in accordance with the invention.

Referring to FIG. 16, a guyless tower 118 is illustrated as one practical application of the oscillating column system described above. Tower 118 includes a base 120 and tip 122. Base 120 is firmly mounted to and extends up from a foundation 124 which in this case is the earth.

Tower 118 may serve as a radio tower, building or other tall structure. Because tower 118 is subject to loads such as wind, it tends to sway as suggested by dotted lines 126 and 128 of FIG. 16. This sway causes tip 122 to oscillate back and forth much in the same manner as tip 88 of OCS 80 described in FIGS. 8–13 above. Mounted at tip 122 is a chamber system 130 which functions in the same manner chamber system 92 described above. Using a hard-landing slowdown sequence as described in FIGS. 14A–14C, the oscillating swaying motion of tip 122 can be suppressed.

Figure 17:
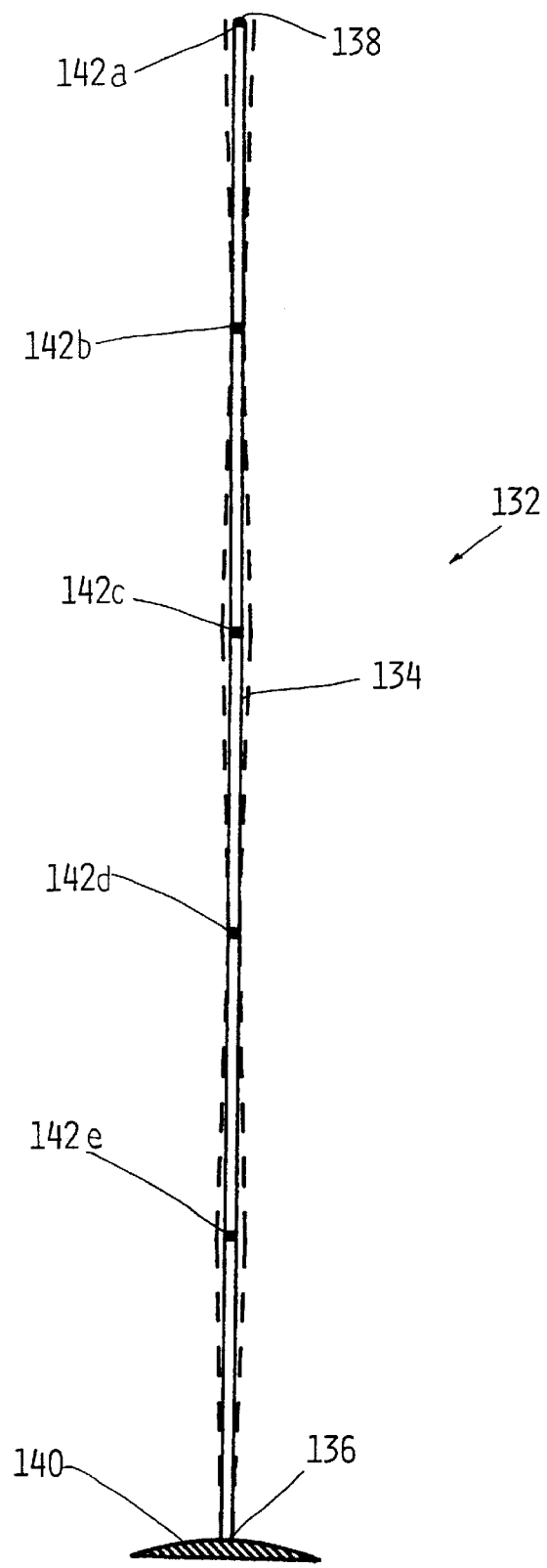
FIG. 17 is an idealized front elevation of a very tall guyless tower stabilized in accordance with the invention.

Referring to FIG. 17, a very tall guyless tower 132 is shown. Tower 132 includes an elongated shaft 134 having a lower end 136 and an upper end 138. Lower end 136 is grounded firmly on a foundation 140 which in this case is the earth. Shaft 134, and in particular its tip 138 is subject to oscillating swaying motion under the influence of wind and other loads. To control this oscillation, a plurality of spaced apart units 142a–142e are provided along the longitudinal extent of shaft 134. Each of units 142a–142e is constructed in the same manner as chamber 92 and may be mounted to shaft 134 by a mounting finger such as mounting finger 90 described above. Each of units 142 is subject to an oscillating motion as shaft 134 sways. Using the hard-landing slowdown sequence described above, each unit 142 can be used to dampen oscillation of shaft 134 along its longitudinal extent. By using multiple units 142, it is possible to more effectively suppress oscillatory movement of shaft 134.

Figure 18:
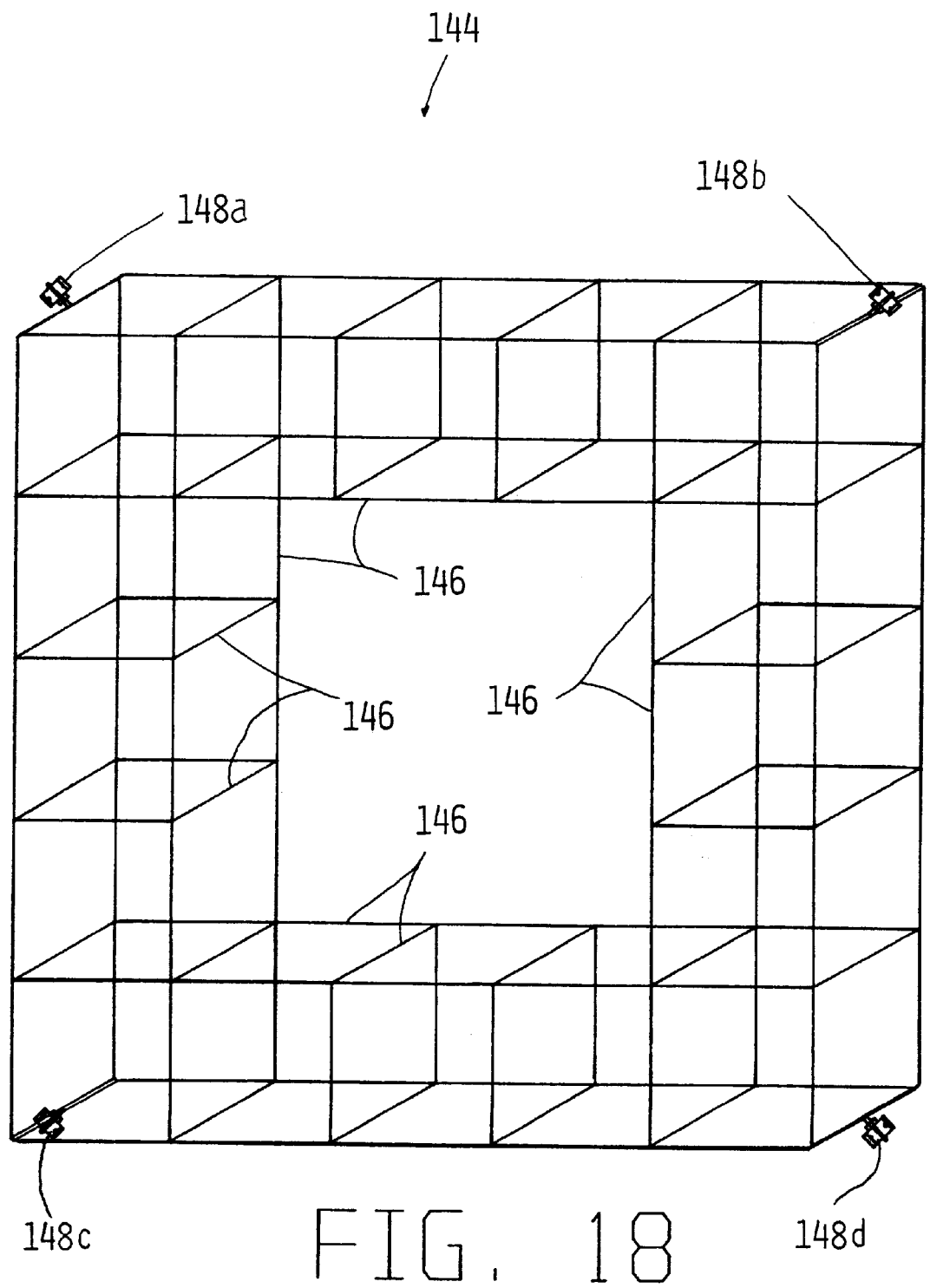
FIG. 18 is an idealized perspective view of a space station superstructure that is stabilized in accordance with the invention.

Referring to FIG. 18, a space station 144 is shown illustrating a second practical application of OCS 80 described above. Space station 144 includes a plurality of elongated members 146. (Not every member 146 shown in FIG. 18 is indicated by a reference number). Members 146 are joined together in a suitable fashion to form an overall superstructure, which for purposes of illustration is shown here as a series of cubic elements forming a box-like structure. Because of the immensity of space station 144, each of members 146 tends to be very long, thin, and subject to oscillation. Unless these oscillations are dampened, the structural integrity of space station 144 is jeopardized. In accordance with the invention, a plurality of units 148 may be located along selected ones of members 146. Each of units 148 operates substantially in the same manner as chamber 92 described above in connection with FIGS. 8–13. In this manner, oscillation or swaying of elongated members 146 may be suppressed by the units 148 using the hard-landing slowdown sequence described above.

C. Rotating System

Configuration

Figure 19:
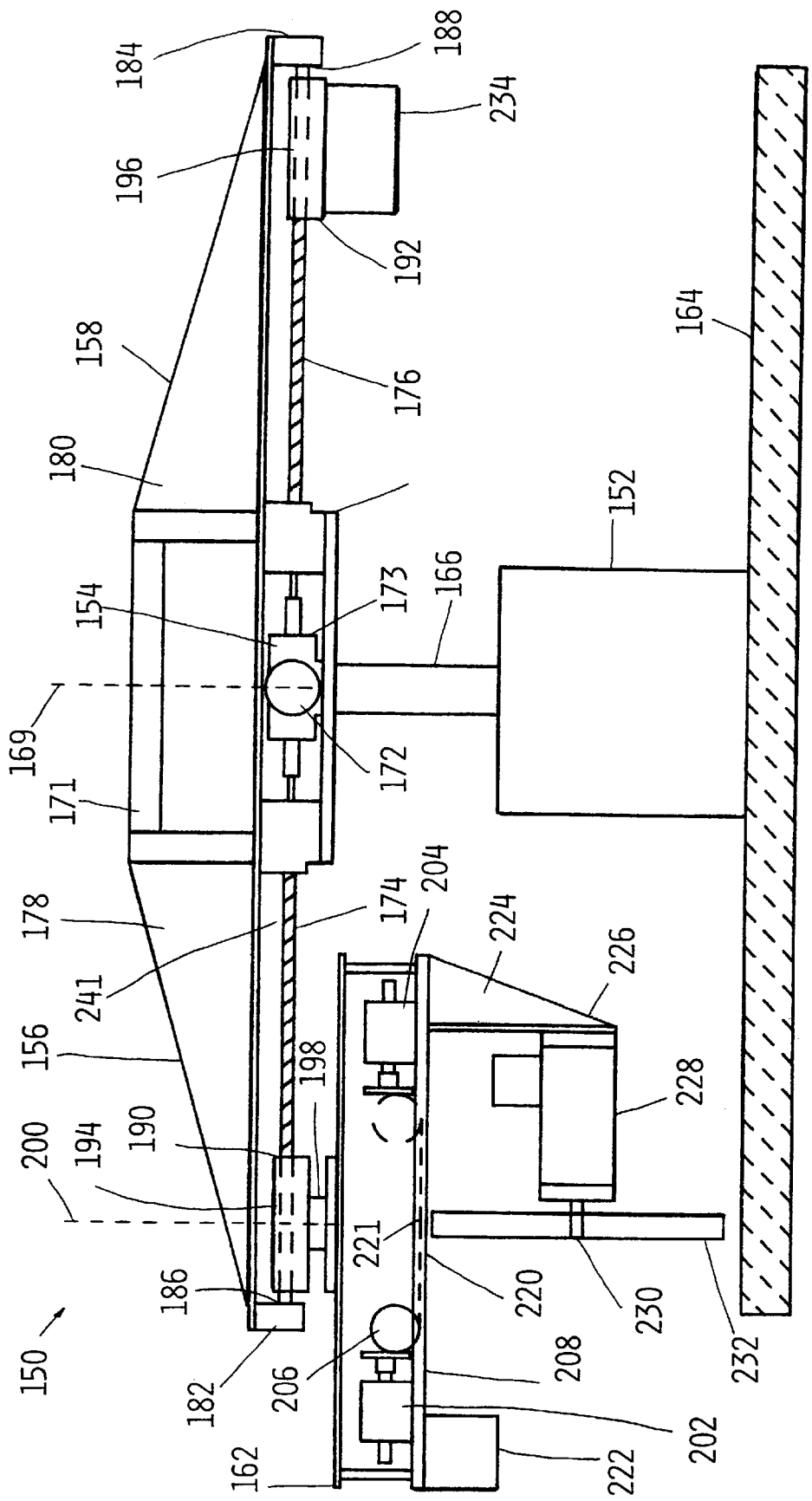
FIG. 19 is a front elevation view of a rotating system in accordance with the invention.

Referring to FIGS. 19 (front elevation) and 20 (top plan view) a rotating system (or "driver") 150 and accompanying drive motor 152 in accordance with the invention are illustrated. System 150 includes an actuator 154 mounted for rotation on top of drive motor 152, a pair of horizontal arms 156 and 158 extending radially and 180 degrees apart from actuator 154 (see FIG. 19), and a chamber assembly 162 connected to the distal end of arm 156.

Motor 152 is securely mounted to a large primary mass 164, which in this case is a spacecraft orbiting the earth. Motor 152 includes a drive shaft 166 which extends perpendicular to the longitudinal extent of arms 156 and 158, and which is mounted to a bearing 168. Drive shaft 166 and bearing 168 rotate about a common axis 169. (Shown as a dotted line in FIG. 19.) Bearing 168 provides a circular platform that lies in a plane perpendicular to the longitudinal extent of drive shaft 166, and is concentrically aligned with axis 169. Actuator 154 is secured to the planar face of the bearing 168. Bearing 168 can be selectively coupled and decoupled from drive shaft 166 to allow actuator 154 (and arms 156 and 158) to spin about axis 169 in a free-wheeling mode. For clarity, drive motor 152, drive shaft 166 and bearing 168 are not shown in FIG. 20.

Actuator 154 includes a housing 171 in which a stepper motor 172 and transmission box 173 coupled to stepper motor 172 are mounted. Arms 156 and 158 include left and right threaded shafts 174 and 176 and support fins 178 and 180, respectively. Fins 178 and 180 are mounted to housing 171. Longitudinal ends of shafts 174 and 176 are drivingly engaged to stepper motor 172 via transmission box 173, which includes internal gearing (not shown) to drive both shafts 174 and 176 in the same direction as stepper motor 172 rotates. Shafts 174 and 176 are radially extending with respect to the axis 169. Depending from the distal tips of fins 178 and 180 are mounts 182 and 184, respectively. The longitudinal ends 186 and 188 of shafts 174 and 178 rotatably received by mounts 182 and 184, respectively.

Mounted on shaft 174 is a carriage 190, and mounted on shaft 176 is a carriage 192. Carriages 190 and 192 include right- and left-threaded bore portions 194 and 196, respectively. Shafts 174 and 176 have a complimentary threads and are received by threaded bore portions 194 and 196, respectively. Thus, the rotation of shafts 174 and 176 by stepper motor 172 causes carriages 190 and 192 to be selectively retracted and extended relative to actuator 154. Notably, stepper motor 172 drives shafts 174 and 176 in the same direction. However, carriage 190 and shaft 174 are right-threaded, while carriage 192 and shaft 176 are left-threaded. Thus, the actuation of stepper motor 172 in a given direction causes carriages 190 and 192 to move selectively either toward or away from each other, thereby driving carriages 190 and 192 closer or farther from actuator 154 as desired.

Chamber assembly 162 is mounted to carriage 190 via a rotatable coupling 198. Coupling 198 allows chamber assembly 162 to spin freely about the axis indicated by dotted line 200. Note that chamber assembly 162 has been rotated ninety degrees between FIGS. 19 and 20 for more clear illustration. Chamber assembly 162 includes a left solenoid 202 and right solenoid 204, along with a metallic ball mass 206 which is shuttled between solenoid 202 and 204 in the same manner as described above in connection with chamber 56 of the pendulum system 50 in FIGS. 1–4. Solenoid 202 is magnetized to hold ball mass 206 in place when ball mass 206 is resting on push plate 212.

Figure 20:
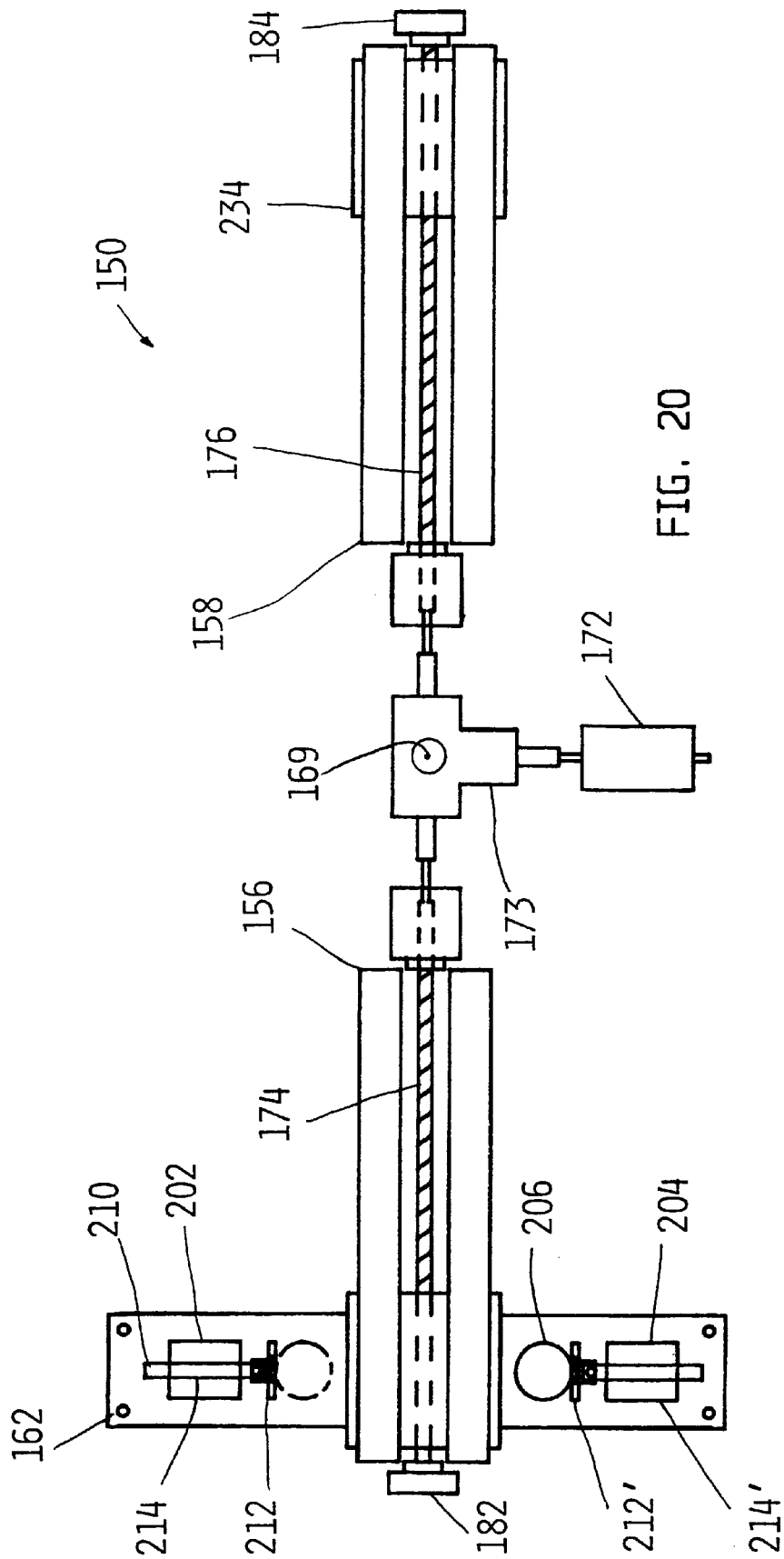
FIG. 20 is an top plan view of the rotating system of FIG. 19.

Chamber assembly 162 includes a box-like housing 208 in which solenoids 202 and 204 reside. For clarity, the side walls of housing 208 are shown removed to reveal the interior of chamber assembly 162. Solenoid 202 includes a retractable finger 210 and a pushplate 212 (See FIG. 20) mounted to retractable finger 210 for impact contact with ball mass 206. Finger 210 is mounted within a frame 214 for reciprocating back-and-forth movement in the same manner as finger 76 of FIG. 1A. Finger 210 is spring-biased in its retracted position. A conventional electromagnetic assembly with frame 214 applies magnetic force in response to a control signal (described below) that sufficient to overcome the spring bias and thrust finger 210 outward. As seen in FIG. 20, solenoid 204 has its own pushplate 212' and finger 214' corresponding and comparable to pushplate 212 and finger 214.

As will be seen below, when ball mass 206 is resting on pushplate 212, the outward thrusting of finger 210 is sufficient to launch ball mass 206 toward solenoid 204. It will be noted that solenoids 202 and 204 are spaced apart on opposite sides of chamber assembly 162. The construction of solenoid 204 is substantially identical as that of solenoid 202.

As shown in FIG. 19, chamber assembly 162 includes a floor 220. Floor 220 may include a deep groove 221 (illustrated by dashed lines) sized to accommodate ball mass 206 and which can span between solenoid 202 and 204 to provide a track for guiding ball mass 206 as it travels from solenoid 202 to solenoid 204.

Referring to FIG. 19, a counterweight 222 depends from floor 220 of chamber assembly 162 directly beneath solenoid 202. A mounting fin 224 depends from chamber assembly directly beneath solenoid 204. Mounting fin 224 tapers to a lowermost point 226 where a motor 228 is mounted. Motor 228 is positioned so that its drive shaft 230 is horizontal and parallel to the groove track 220 (and also perpendicular to the axis of rotation 169). A flywheel 232 is mounted to drive shaft 230 so that the combination of motor 228 and flywheel 232 operate as a gyroscope. When motor 228 spins flywheel 232, the resulting gyroscope forms a stabilizer tending to keep chamber assembly in a constant orientation. Counterweight 222 offsets the weight of motor 228 and flywheel 232.

A counterweight 234 is attached to carriage 192 and provides a balance to offset the weight of carriage assembly 162.

Operation

Figure 21:
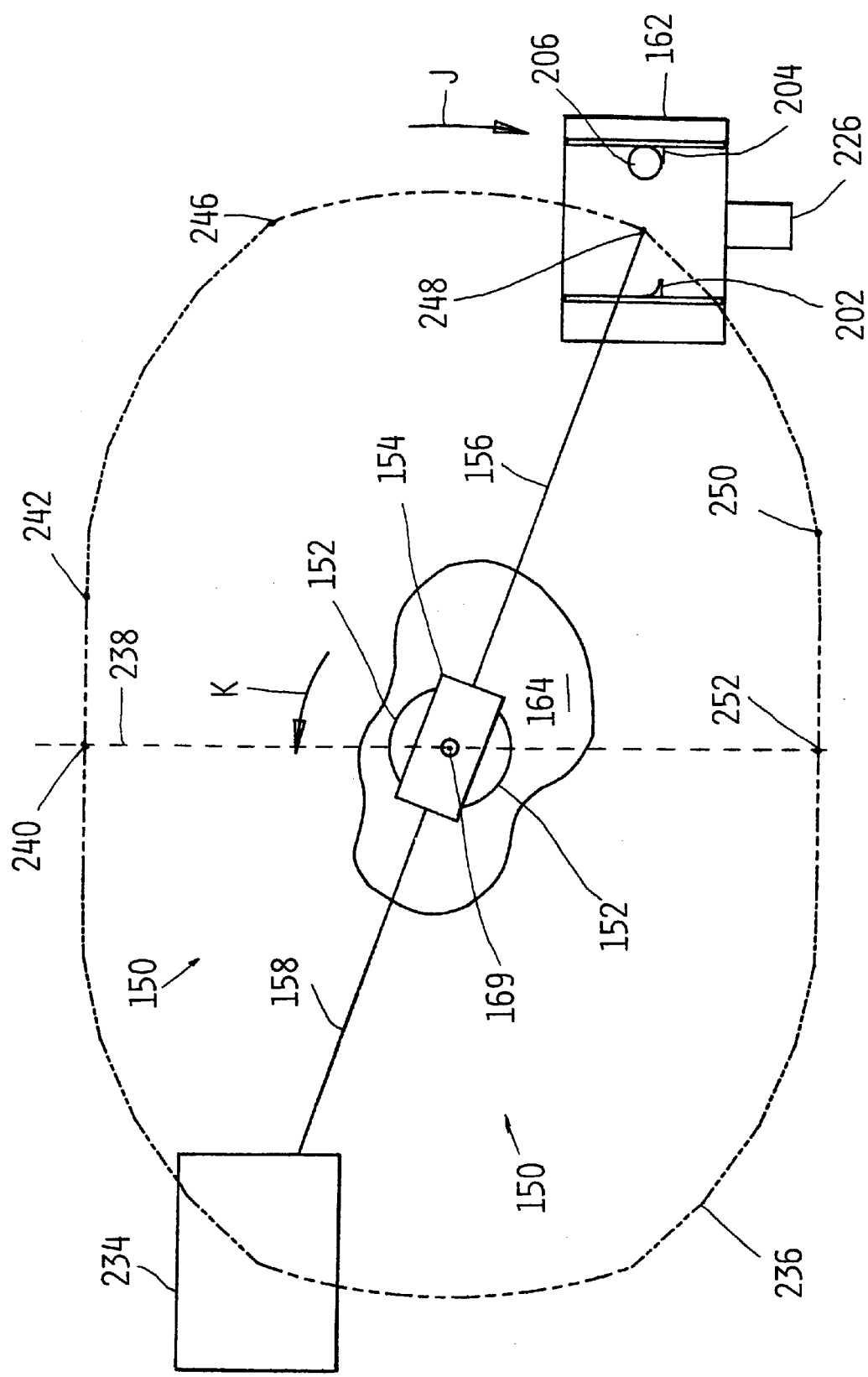
FIG. 21 is an idealized diagram showing the path of rotation of the system of FIG. 19 at a first point in time.
Figure 22:
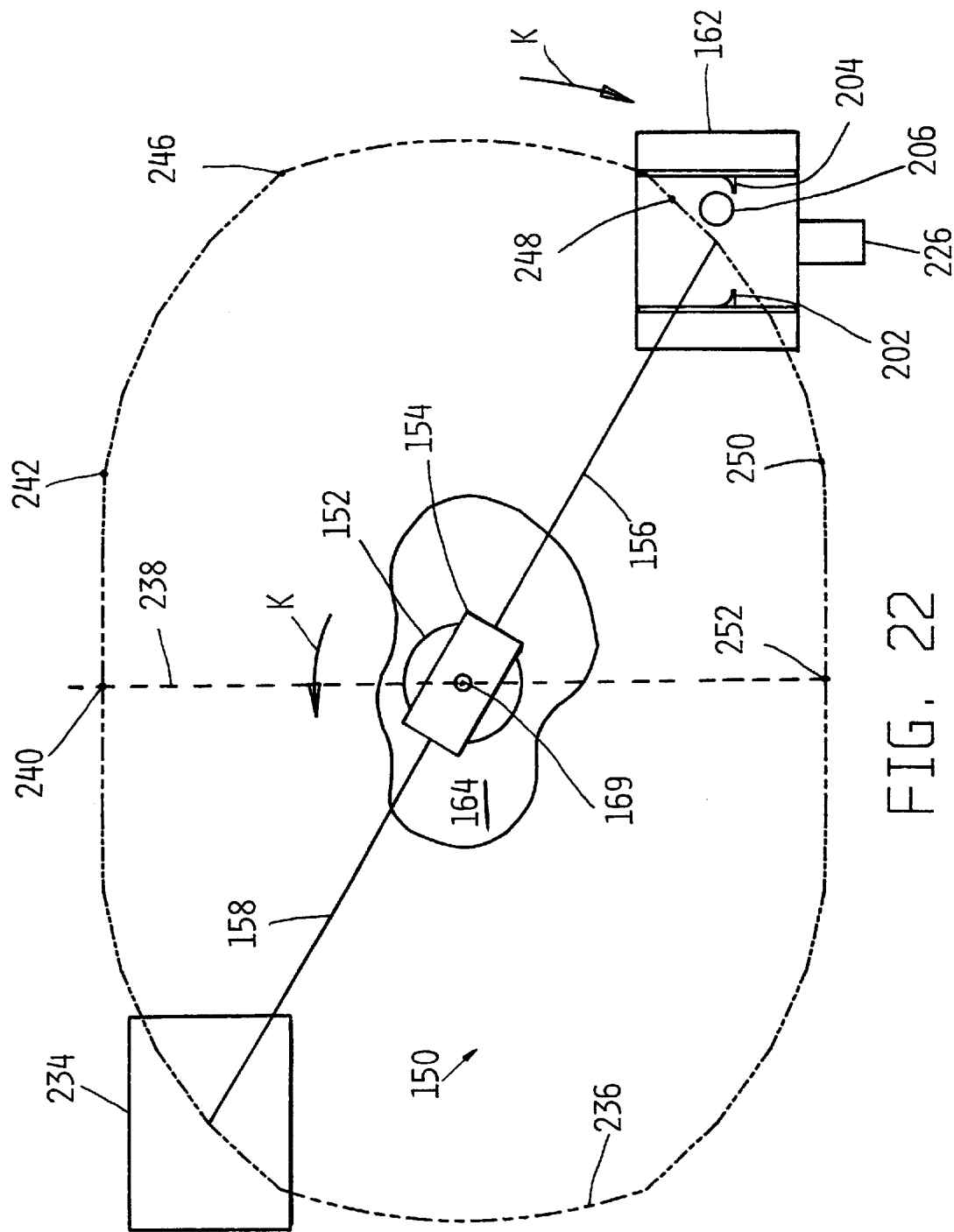
FIG. 22 is an idealized diagram showing the path of rotation of the system of FIG. 19 at a second point in time.
Figure 23:
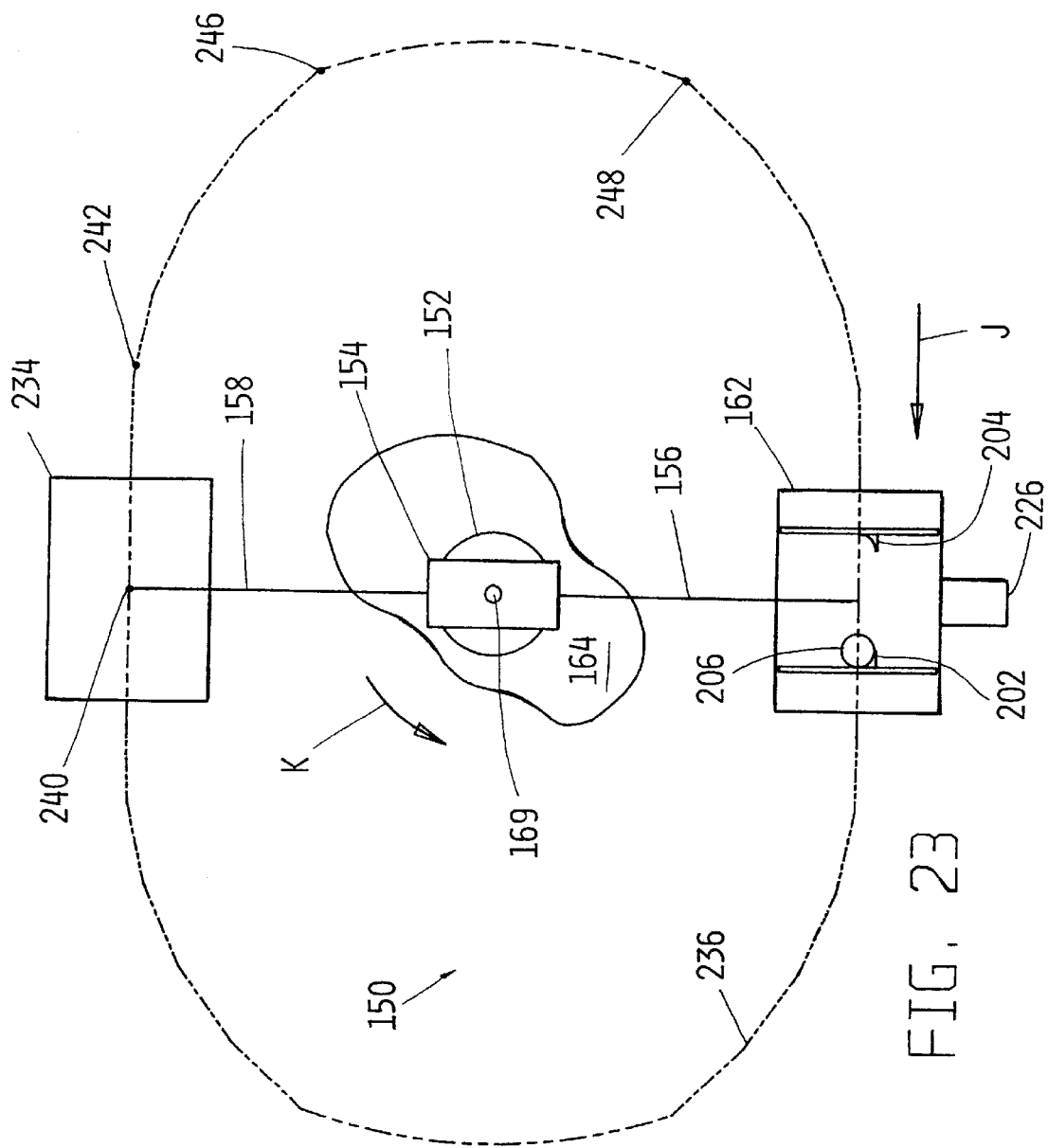
FIG. 23 is an idealized diagram showing the path of rotation of the system of FIG. 19 at a third point in time.

The operation of rotating assembly 150 is illustrated in idealized drawings of FIGS. 21 through 23. Referring to FIG. 21, the operation begins with motor 152 rotating drive 154 about axis 169 in the direction of arrow J. It will be recalled that motor 152 is connected to actuator 154 via bearing 168 and drive shaft 166 as shown on FIG. 19. This rotation spins actuator arms 156 and 158 (which are attached to actuator 154 via housing 171) about axis 169.

Accordingly, chamber assembly 162 travels over a generally circuitous path 236.

As motor 152 accelerates system 150, arms 156 and 158 remain stationery so that chamber assembly 162 remains at a fixed radial distance from axis 169. As a result of accelerating system 150 in the direction of arrow J, motor 152 also imparts a rotational motion on primary mass 164 in the direction of arrow K. Once actuator has been accelerated to the maximum rotational velocity sustainable by motor 152, bearing 168 is disengaged from drive shaft 168 to allow system 150 to rotate over in a free-wheeling mode. In this free-wheeling mode, actuator 154 and primary mass 164 coast (in a rotational sense). However, because mass 164 is a much larger than system 150 (such as a spacecraft or satellite), its rotation is much slower relative to the rotation of system 150.

A similar acceleration process is used in conventional systems, where the force interchange between a motor and a spinning secondary mass (such as 152 and actuator 154) can be used to provide some control over the rotation of a spacecraft (such as primary mass 164). The difficulty in conventional systems is that once spinning secondary mass has reached its maximum rate of rotation, it can no longer be used to continue to increase the rotational velocity of primary mass. Further rotational acceleration of the spacecraft requires that the spinning mass be somehow decelerated without imposing an impulse on the spacecraft. Until the present invention, the only way to accomplish this would have been through retro-rockets or other expulsive propulsion systems.

In accordance with the invention, rotating system 150 is decoupled from drive motor 152 and mass 164, and is decelerated in a manner that does not impose an impulse on primary mass 164 or require the use of retro rockets. Once actuator is successfully decelerated, it is reengaged to primary mass 164 (via drive shaft 166), and reaccelerated by means of motor 152. This reacceleration again imposes an impulse on primary mass 164 that is cumulative with the impulse imposed during the first motor-driven acceleration described above. By repeating this process of couple/accelerate—decouple/decelerate, the rotational momentum of primary mass 164 may be increased without resorting to the use of retrorockets or other expulsive propulsion systems.

Generally speaking, the deceleration of system 150 in accordance with the invention is accomplished by shuttling ball mass 206 between solenoids 202 and 204 in a manner similar to that described above in connection with FIGS. 1–4. This deceleration process is described in FIGS. 21–23. For clarity, the illustrations of FIGS. 21–23 are idealized diagrams of the system illustrated in FIGS. 19 and 20.

Referring first to FIG. 21, it will be seen that as actuator 154 rotates in its free-wheeling mode, stepper motor 172 is activated to selectively extend and retract carriages 190 and 192 via shafts 174 and 176, respectively. This retraction-extension cycle occurs once every 180 degrees of rotation of actuator 154, and is shown by dotted path 236.

Assuming dotted line 238 of FIG. 21 to be zero degrees of rotation, chamber assembly 162 would be at a point 240 when actuator 154 is orientated at zero degrees. At this point, carriage 190 is fully retracted and located near 241 (see FIG. 21). Carriage 190 remains in this fully retracted position as actuator 154 rotates through the first 30 degrees of rotation, bringing chamber assembly 162 to a point 242.

When chamber assembly 162 is at point 242, stepper motor 172 is activated to begin extending carriages 190 and 192. Carriage 190 is extended as actuator 154 continues to spin through another 30 degrees until chamber assembly 162 reaches a point 246. It will be noted that the path of travel by chamber assembly 162 between points 240 and 242 is the arc of a simple circle. The path traveled between points 242 and 246 however, is parabolic because of the extension of carriage 190, which places chamber assembly 162 at a longer radius from actuator 154 as system 150 spins.

As chamber assembly 162 passes point 246, carriage 190 is fully extended toward distal end 186 of shaft 174. From this point onward, carriage 190 is held stationary so that as actuator 154 spins, chamber assembly 162 again travels through the arc of a simple circle. It will be appreciated that the rotation of actuator 154 decreases in velocity between points 242 and 246 as the radial distance between chamber assembly 162 and actuator 154 increases.

Actuator 154 continues rotating past point 246 through another approximately 45 degrees of rotation until chamber assembly 162 reaches point 248. At this point, ball mass 206 resides on solenoid 204, as shown in FIG. 21. To reduce the rotational momentum of the spinning system, ball mass 206 is launched from solenoid 202 toward solenoid 204 just as chamber assembly 162 passes point 248. This launching causes a momentum-decreasing force interchange much like the soft landing sequence described above in connection with pendulum system 50 of FIG. 1.

Referring to FIG. 22 when chamber assembly 162 is at point 248, solenoid 204 is actuated to extend finger 210 and launch ball mass 206 off pushplate 212 and toward solenoid 202. This launch is an action-reaction force interchange that pushes chamber assembly 162 (and all of rotating system 150) in the opposite direction as the trajectory of ball mass 206. In this case, a vectored component of this force will be in a direction opposite the tangential velocity of chamber assembly 162 as it rotates in direction of arrow J. This component reduces the rotational velocity of chamber assembly 162, thereby reducing the rotational momentum of rotating system 150.

At the same time as ball mass 206 is launched from solenoid 204, stepper motor 172 is actuated to begin retracting carriages 190 and 192 back toward actuator 154. This retraction takes place as actuator 154 spins through another 30 degrees to place chamber assembly 162 at point 250 (See FIGS. 21 and 23). During this portion of the rotation (between points 248 and 250), chamber assembly 162 is drawn closer to actuator 154 by retracting carriage 190. Consequently, chamber assembly 162 travels along a parabolic path between points 248 and 250.

As chamber assembly 162 moves between points 248 and 250, the rotational velocity of system 150 increases in much the same way as a spinning ice skater's rotation is accelerated when he or she draws his or her arms in towards the body. It will be appreciated that during this same time, ball mass 206 is moving substantially as a free body on a trajectory between solenoid 204 and 202. When mass 206 was launched from solenoid 204 at point 248 (See FIGS. 22 and 23), its speed exceeded that of chamber assembly 164. However, as the rotational velocity of system 150 increases, so does the tangential velocity of chamber assembly 164, until the tangential velocity of the chamber assembly 164 approaches that of ball mass 206.

Ideally, ball mass 206 collides with solenoid 204 as chamber assembly 162 passes point 252 (see FIGS. 21 and 23), where chamber assembly's 162 velocity has peaked. Because the velocity of chamber 162 (and, naturally, solenoid 204) have increased to nearly the same velocity as ball mass 206, the resulting collision is a "soft-landing" comparable to that described above in connection with pendulum system 50 of FIG. 1. Consequently, there is no (or at least rather small) action-reaction force interchange between ball mass 206 and chamber assembly 162 upon landing, and therefore no (or little) change in rotating system's 150 momentum to offset the momentum-dampening effects of the launch of ball mass 206 from solenoid 204.

The net result of launching ball mass 206 from solenoid 204 at point 248 and the collision of ball mass on solenoid 202 at point 252 is that rotating system 150 has lost momentum without imparting a pulse on primary mass 164 or resorting to retrorockets. In practice, some pulse will be applied to primary mass 164 due to the effects of friction in the coupling of drive shaft 166 and bearing 168.

As chamber assembly 162 passes point 250, carriage 190 is held in a fixed position so that chamber assembly 162 again travels along the arc of a simple circle until it arrives at point 252. This cycle of extension-retraction and launch-collision that takes place during 180 degrees of rotation between points 240 and 252 can be repeated as actuator 154 rotates through another 180 degrees of rotation between points 252 and 240. During that half-cycle, ball mass 206 will be launched from solenoid 202 to collide with solenoid 204.

Figure 24:
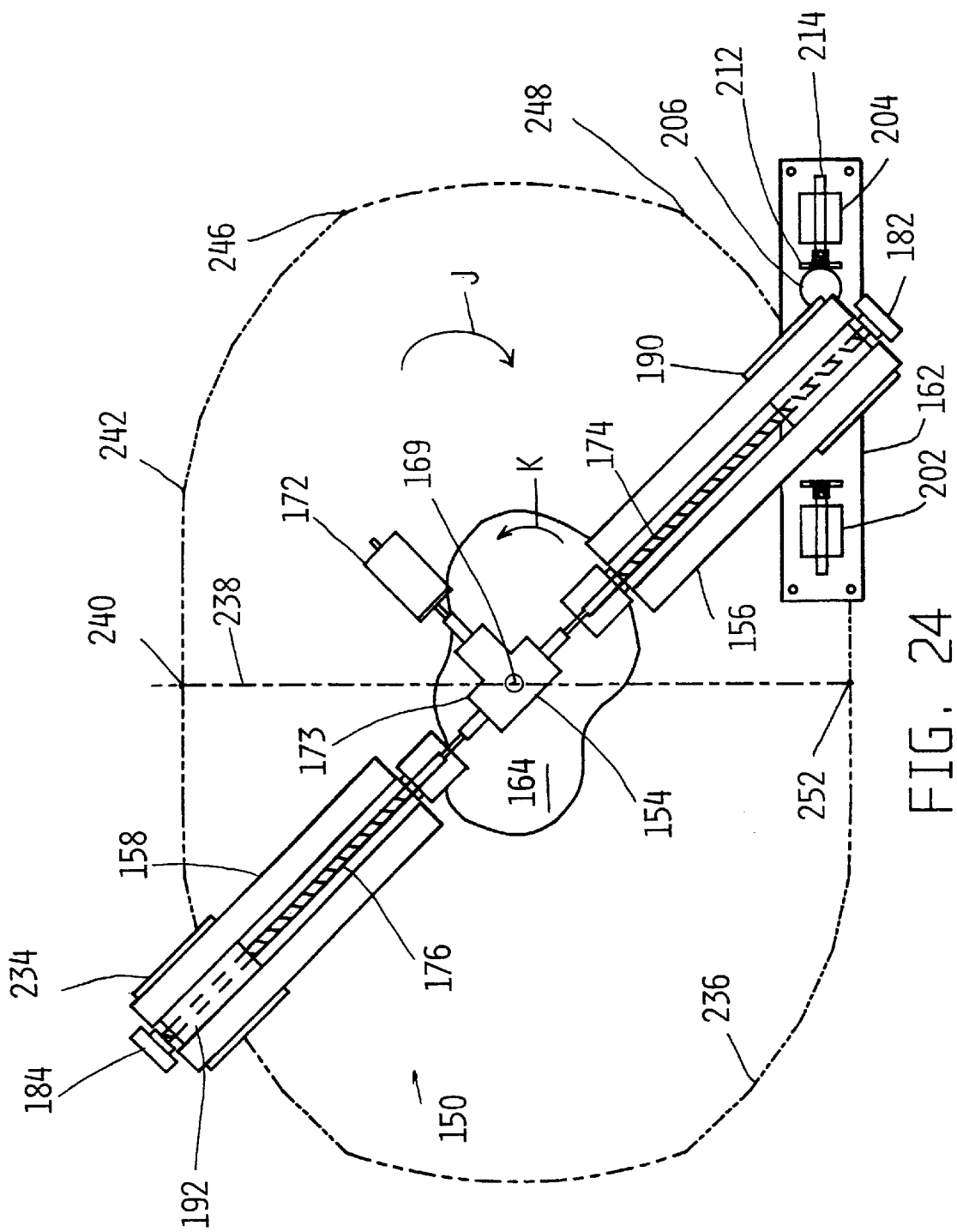
FIG. 24 is a top plan view of the system of FIG. 19 shown in the position depicted in the diagram of FIG. 21.
Figure 25:
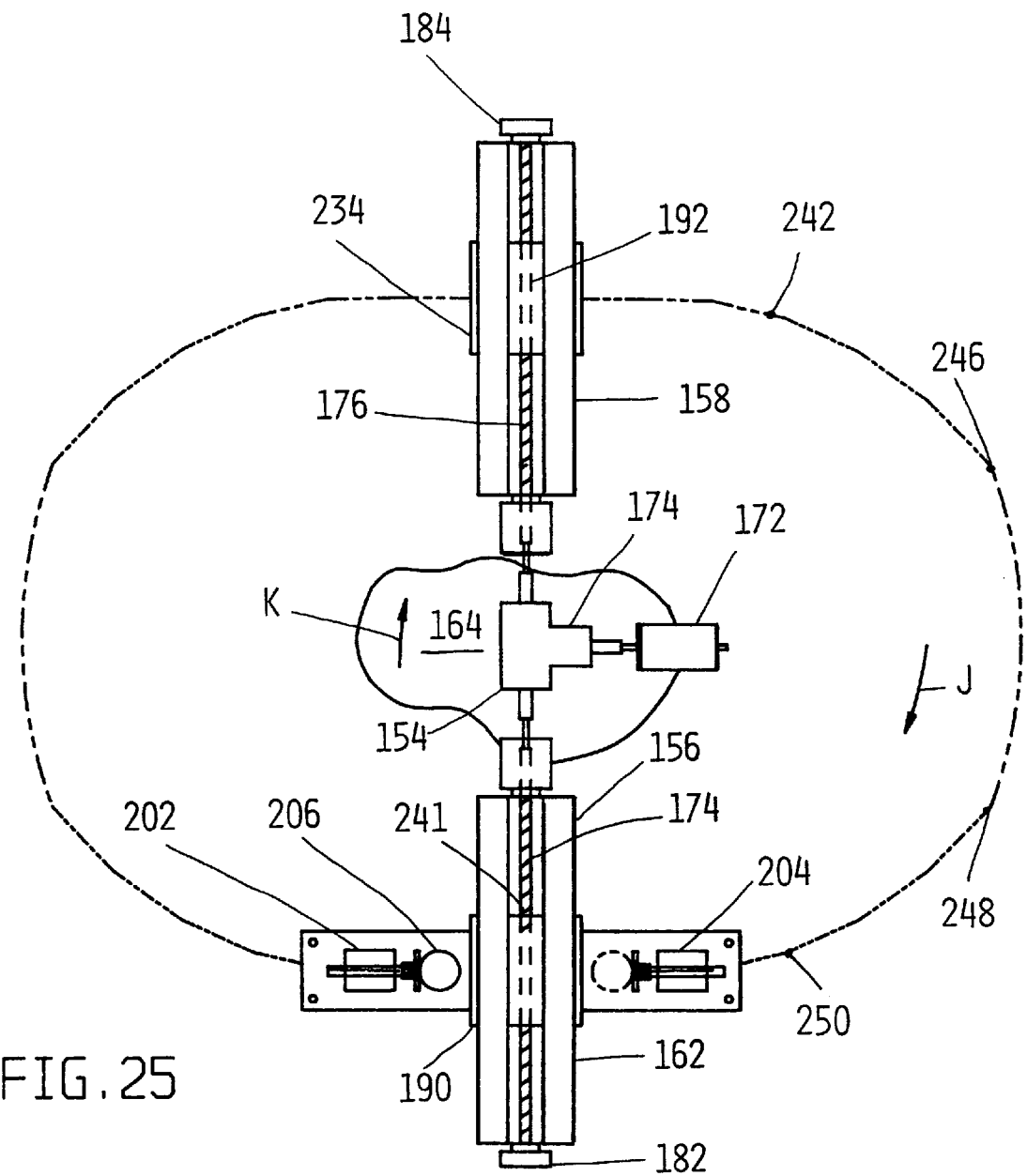
FIG. 25 is a top plan view of the system of FIG. 19 shown in the position depicted in the diagram of FIG. 23.

Referring to FIGS. 24 and 25, the foregoing operation is illustrated in the top plan view. FIG. 24 shows system 150 in the same configuration as the diagram of FIG. 21. In particular, chamber assembly 162 is just passing points 248 prior to launching ball 206 from solenoid 204 toward solenoid 202. FIG. 25 illustrates system 150 in the same configuration as FIG. 23. Note that in FIG. 25 chamber assembly 162 is at point 252 along path 236. Ball mass 206 has just landed on solenoid 202, and carriage 190 is in its fully retracted position.

Application

The deceleration process can be repeated, and the cumulative pulses applied by each cycle will reduce the momentum and rotational velocity of system 150. When system 150 is sufficiently decelerated, it can be recoupled to primary mass 164 via drive shaft 166, and reaccelerated using motor 152. As explained above, the action-reaction force interchange that occurs when drive motor 152 accelerates system 150 causes primary mass 164 to rotate in the direction of arrow K. In effect, the invention is used to "wind-up" the rotation of primary mass 164.

For example, it would be possible, using the system described above, to set a giant space station into rotation. Each acceleration-deceleration cycle of rotating assembly 150 cumulatively adds to the rotation of the space station (represented here as primary mass 164) until that station has achieved the desired rotational velocity.

Theoretically, the invention could be used to change the rotational velocity of an asteroid, moon or planet by placing a massive system like system 150 at the pole of the asteroid, moon or planet. Since the momentum transfer is achieved by kinetic exchanges of a mass (i.e., ball mass 206) internal to system 150, the invention avoids or reduces the need for expulsive propulsion systems (such as retrorockets). This results in substantial savings because it is extremely expensive to a haul expulsive rocket fuel up into space.

Optimization

Figure 26:
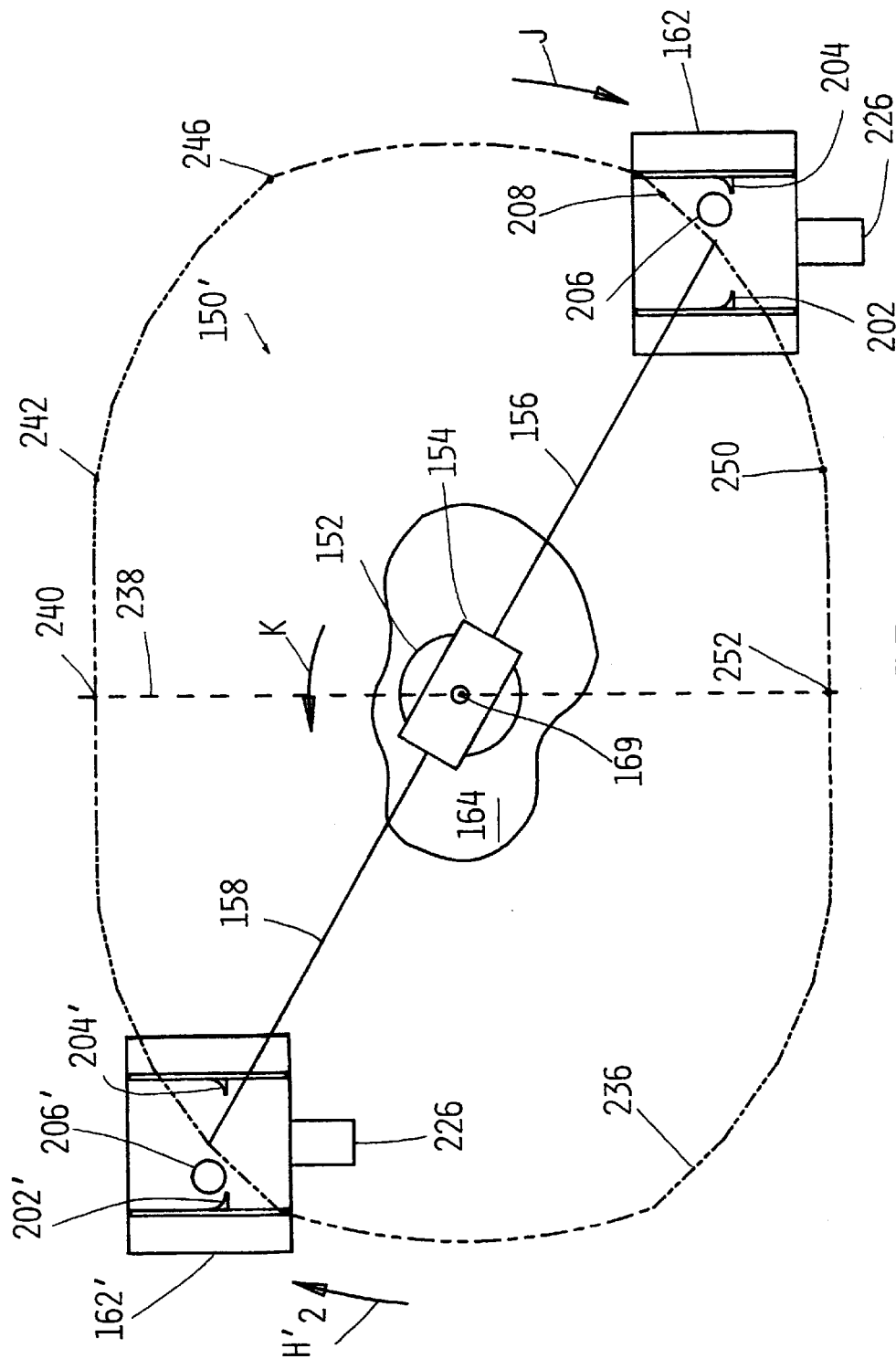
FIG. 26 is a diagram showing the path of rotation at a first point in time of an alternative embodiment of the system of FIG. 19.
Figure 27:
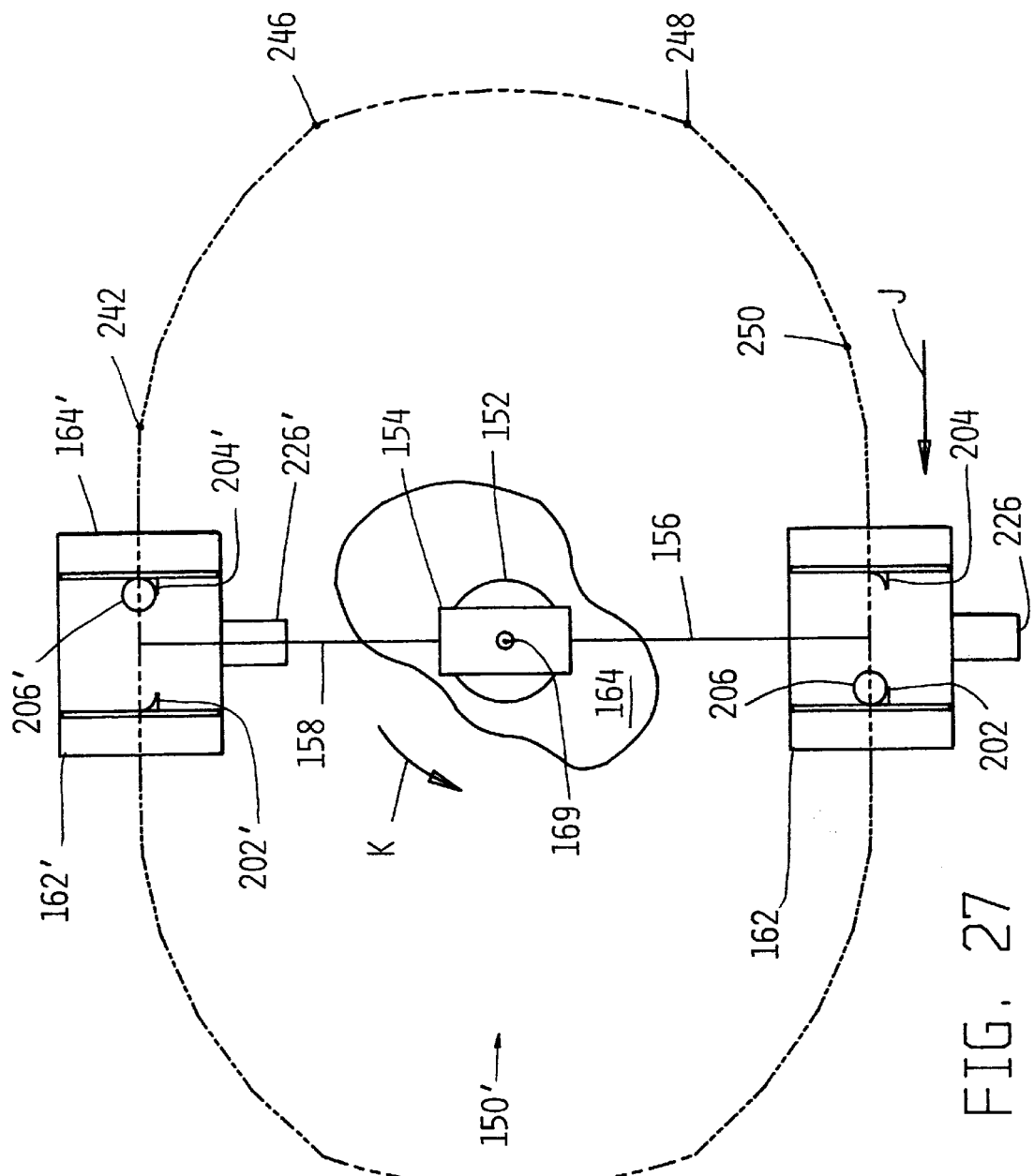
FIG. 27 is a diagram showing at a second point in time the path of rotation of an alternative embodiment of the system of FIG. 19.

There are a number of ways in which the rotational system described above may be optimized. First, a second chamber system can be added as shown in FIGS. 26–27. Referring to FIG. 26, a diagram of system 150' is shown having a chamber assembly 162' in addition to chamber 162. Chamber assembly 162' is substituted for counter balance 234 depicted in FIG. 19. Chamber assembly 162' includes solenoid 202', solenoid 204' and ball mass 206'. It operates like (although in the mirror image of) chamber assembly 162 described above. FIG. 26 shows system 150' in the same configuration as system 150 depicted in FIG. 22. Notably, ball mass 206' is launched from solenoid 202' toward solenoid 204' at the same time as ball mass 206 is launched from solenoid 204 toward solenoid 202.

It will be appreciated that upon the launch and impact, ball masses 206 and 206' do not travel along the same tangential path as their respective chamber assemblies 162 and 162'. Thus, both the launch and the impact velocities of ball masses 206 and 206' will have vectors with components that are tangential and radial relative to the rotation about axis 169.

It will be appreciated that the tangential component of ball mass' 206' velocity is additive in effect with the tangential component of ball mass' 206 velocity, yet the respective radial components of each ball's velocities cancel each other out. This occurs for the simple reason that radially extending arms 156 and 158 are 180 degrees apart.

Thus, by using a second chamber assembly on arm 158, additional momentum-dampening is achieved by doubling the tangential components of force vectors while at the same time canceling out the undesirable radial components.

A second way to optimize the system is to control the trajectories of ball mass 206 and chamber assembly 162 so that ball mass 206 collides with solenoid 202 exactly at point 252 and the tangential velocity of solenoid 202 and ball mass 206 are identical at impact.

There are four variables that can control this process:

(a) the speed and trajectory that ball mass 206 is launched from solenoid 202;

(b) the timing of the launch relative to the rotation of actuator 154 (in this case, point 248 is selected; other launch points are possible);

(c) the rate at which actuator 154 retracts chamber system 162;

(d) and the rotational velocity of actuator 154 when free-wheeling mode begins (note that that velocity will decrease with each extension-retraction cycle described above).

For specific implementations of the invention, these variables should be adjusted empirically to achieve best results. Even if optimum conditions are not obtained however, it is believed that rotating system 150 can still be decelerated in accordance with the invention so long as the tangential velocities of chamber is increased during the free-body trajectory of ball mass 206. The velocity matching at collusion-time described above makes the system more efficient but is not strictly required.

A computer-assisted simulation was used to experiment with optimizing system 150. To express the results of the simulations, the following conventions are adopted: M1 is the mass of ball mass 206. M2 is the mass of the chamber 164. Rc is the radius of the circular portion of the path 236 at point 246 that M2 follows. Re is the distance from the center to the chamber at point 252; this is the variable dependent on the degree to which actuator 154 has pulled chamber 164 in. S1 is the distance (straight line) that ball mass 206 travels between points 248 and 252 after it is launched. S2 is the distance (actual curved) that chamber 162 travels between points 248 and 252 after launching has occurred. V1 is the velocity that the chamber 164 is spinning when it is tethered at a distance Re. Vs is the velocity of separation between M1 and M2 immediately after M1 has been launched. It is not the velocity of either M1 or M2 relative to a stationary observer. Vrm1 is the velocity, relative to a stationary observer, of M1 after it has been launched; after it has reacted with M2. Vrm2 is velocity, relative to a stationary observer, of M2 after it has been launched; after it has reacted with M1. tm1 is the time it takes M1 to travel from point 248 to 252. tm2 is the time it takes M2 to travel from point 248 to 252; ideally tm2=tm1. Vram2 is the final velocity of M2 after it has been pulled in toward the center by the actuator; ideally, this will occur at point 252. Vm2 is the average velocity of chamber 162 as it travels from point 248 to 252. am2 is the rate that M2 accelerates between point 248 and 252. Sm2 is the actual distance that M2 travels before it is rejoined by M1. Ideally, this is equal to the distance from point 248 to 252.

A simulation was then under-taken of the dynamics of ball mass 206 in a specific embodiment having the following characteristics: M1 equals 1 kg; M2 equals 2 kg; Vs equals 18 cm/sec; V1 equals 25 cm/sec; Rc equals 25 cm, and pushplates 212 and 212' were inclined at 15° (as described below).

A simulated launch of ball mass 206 at point 248 (that is, 135 degrees clockwise from point 240) resulted in a nearly soft-landing collision of ball bass 206 and left solenoid 202 at point 252 that reduced the overall momentum of system 150. Ball mass 206 achieved a Vrm1 of 29.267 cm/sec. S1 was 22.602, S2 was 18.113 and Re was 21.274. Chamber 162 began with Vrm2 equal to 22.0 cm/sec and accelerated to Vram2 equal to 25.853 cm/sec.

It will be noted that Vram1 and Vrm2 (velocities of ball mass 206 and chamber 162 at collision-time) were not equal, as they ideally should be. The reason is that between points 248 and 252, ball mass 206 travels further than chamber 162 (that is, ball mass 206 has to travel the straight-line distance between points 248 and 252 plus the distance across chamber 160). As a result, when parameters are successfully chosen to allow both ball mass 206 and chamber 162 masses to arrive at point 252 simultaneously, ball mass 206 has a greater velocity (that is, velocity matching was not perfectly obtained). This difference amounts to about 13%, and does cause system 150 regain some of the momentum that was dumped at point 248, but the gain is not significant. Overall, there is a net momentum loss.

The following additional observations were made with respect to this experiment and the goal of optimizing performance of system 150:

1. The optimum location for launching ball mass 206 appeared to be point 248 (that is, a point on path 236 representing 135° of rotation by actuator 152 relative to dotted-line 238).
2. The optimum M1:M2 ratio appeared to be 1:2.
3. The optimum V1:Vs ratio appeared to be 1:0.72.
4. The optimum Rc:Re ratio appeared to be 1:0.85.
5. To allow ball mass 206 to collide with left solenoid 202 at point 252, it was empirically derived that solenoids 202 and 204 should be placed at a 15° angle of inclination.

The angle of inclination referred to above means that solenoid 204 should be positioned to orient finger 214' at a degree angle relative to a line that parallel to line 238 (See FIGS. 20 and 21) and intersects the center of ball mass 206 when it is resting on solenoid 204; in this position, the planar face of pushplate 212' is cocked toward actuator 154 at a 15 degree angle with line 238.

Note that there are some minor differences between the drawings and the configuration of the experiment. Specifically, the drawings do not show the 15 degree inclination of pushplates 212 and 212'. Also, the proportions of chamber 164 as shown in the drawings would not accommodate this trajectory. A wider housing 208 would be required. Moreover, if an inclination were used, ball mass 206 would not be able to follow groove 221.

Additional details of these experimental simulations are contained in the inventor's notes entitled "Analysis of M1 and M2 Achieving a Soft-Landing" and "Analysis of Transductional Sequence (TS)", attached as Exhibits A and B, respectively, and hereby incorporated by reference.

Control Circuit

Figure 28:
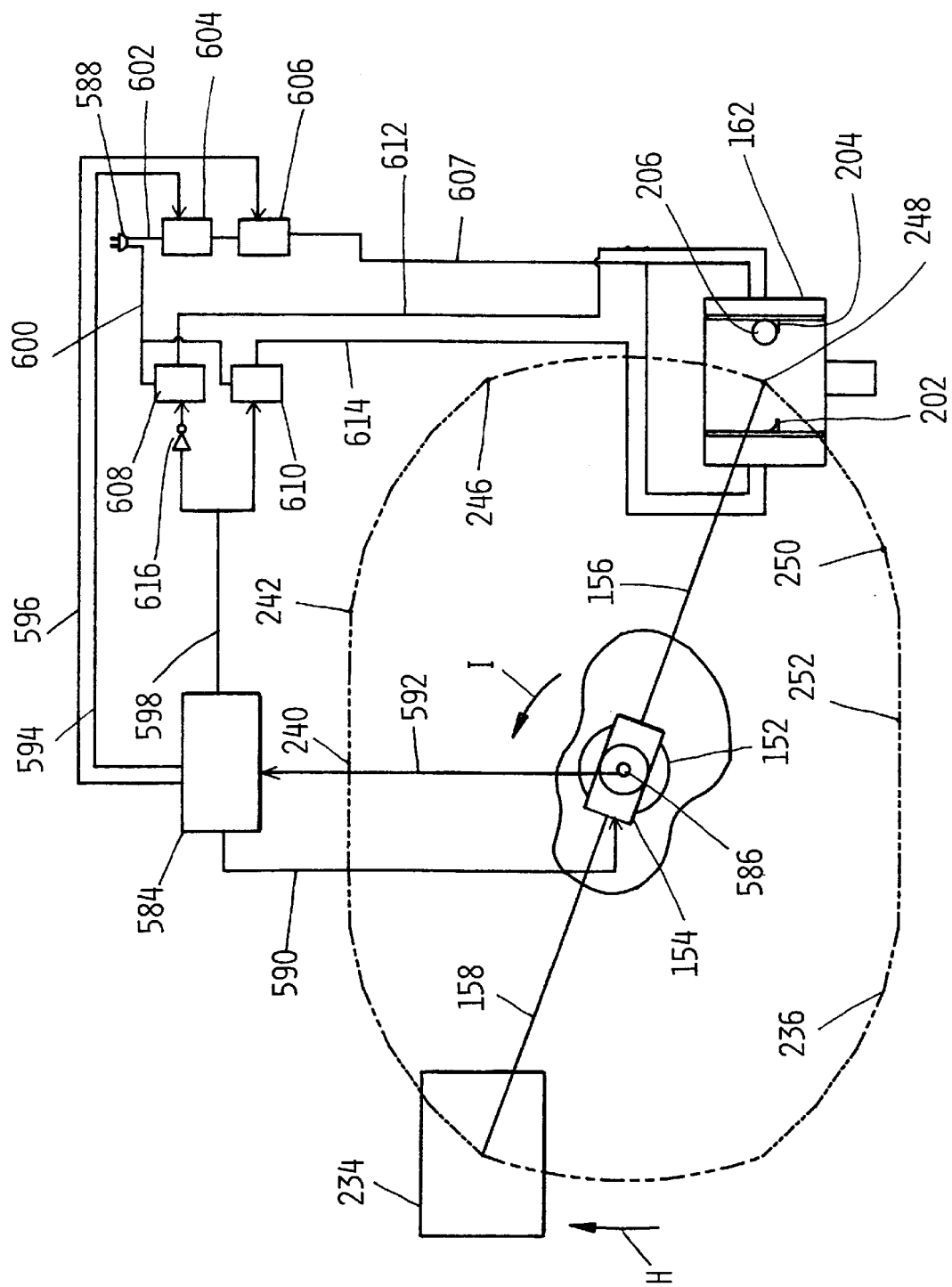
FIG. 28 is a schematic diagram of a control circuit for controlling the rotating system of FIG. 19.

Referring to FIG. 28, a control circuit 582 is shown for controlling the rotating system 150 of FIGS. 18 through 25. For clarity, FIG. 28 is a hybrid diagram of idealized mechanical components and digital circuit elements. The circuit elements are shown in block-diagram format. Control circuit 582 includes a microcontroller 584, a optical encoder 586 and a power supply 588. Suitable microcontrollers are available from Motorola. A suitable encoder is available from BEI (Industrial Encoder Division).

The purpose of control circuit 582 is to detect the speed and position of rotating system 150 and to thereby control the firing of ball mass 206 from either solenoid 202 or 204. Control circuit 582 also controls the extension and retraction of arms 156 and 158 by selectively driving stepper motor 172 via a control signal 590.

Optical encoder 586 communicates with microcontroller 584 via a location signal 592. As actuator 152 rotates, encoder 586 pulses signal 592. By counting these pulses, microcontroller 584 can determine the rotational velocity of actuator 152. Also, optical encoder 586 can send a special pulse when it reaches a reference point (for example, when actuator 152 is orientated at 180 degrees as illustrated in FIG. 25). Thus, as actuator 154 rotates and causes chamber assembly 162 to traverse circuitous path 236, microcontroller 584 can determine chamber assembly's 162 location along path 236. As explained above, at certain positions along path 236, arms 156 and 158 are retracted or extended (such as, for example, at points 240 and 246 of FIG. 21.) Microcontroller 584 can effectuate such extension and retraction by actuating stepper motor 172 using control signal 590.

Using speed and positional information, microcontroller 584 can also initiate the firing of ball mass 206 from either solenoid 202 or 204. This is accomplished by a set of three controls: a power control signal 594, a launch timing control signal 596 and a solenoid select signal 598. Power supply 588 has two feed lines—600 and 602. A relay 604 and an electronically adjustable potentiometer 606 are serially connected with feed line 602 as shown in FIG. 28. Relay 604 is actuated by launch timing control signal 594 and potentiometer 606 is digitally controlled by launch power signal 596.

Line 600 is connected in parallel to relays 608 and 610. When relay 608 is actuated, a circuit is closed to energize solenoid 204 via line 612. When relay 610 is actuated, a circuit is closed via line 614 to energize solenoid 204. Relays 608 and 610 are coupled to microcontroller 584 via the solenoid select signal 598. Signal 598 is coupled directly to relay 610 and coupled to relay 608 via a inverter 616. Thus, depending the value of the signal on line 598, either relay 608 or 610 (but not both) will be open, thus allowing microcontroller to selectively energize either one of solenoids 202 or 204.

For example, as chamber assembly 162 passes desired launch point 248, microcontroller 584 initiates the launch ball mass 206 from solenoid 204 by toggling control signal 598 to actuate relay 608. As explained above, relay 608 closes provides current to solenoid 204 via line 612. At approximately the same time, microcontroller 584 adjust potentiometer 606 to achieve the desired launch speed, and, at the moment of the desired launch time, actuates relay 604 via control signal 594. When relay 604 is actuated, the circuit between power supply 588 and solenoid 204 is closed, and solenoid 204 actuates to launch ball mass 206. It will be realized that the force with which solenoid 204 launches ball mass 206 is related to the current received by solenoid 204 which is in turn controlled by potentiometer 606. Depending on the specific implementation of the invention, some empirical calibration will be required. However, the system need not reach ideal performance to have a momentum reducing effect.

D. Shuttling Systems

For teaching purposes, the invention has been illustrated showing shuttling of mass in the form of a metallic ball that is literally launched from one solenoid to the next. In practice, a more effective method of shuttling mass may be to employ a standard linear servo motor, such as the Model LCD-T made by Anorad Corp. This mechanism has a carriage which is moved along a guide by a DC servo motor. The coupling between the guide and carriage is low-friction and is adapted to allow the carriage move freely along the guide. Each motor is made up of only two parts: a set of electrical coils imbedded within a coil core and a set of rare earth magnets mounted on a steel magnetic plate which generate a high magnetic flux. When the motor applies a magnetic field to the carriage, the carriage is propelled along the guide. Once the carriage is in motion, it can coast along the guide.

When comparing this mechanism to the ball mass depictions described above, the carriage is analogous to the shuttling ball mass, the linear motor is analogous to the solenoids. Once the motor has applied a push to the carriage, the carriage coasts along the guide in a manner corresponding to the free-body motion of the ball mass through the chambers such as chamber 162 described above. Additional details about shuttling mechanisms are available in the inventor's notes entitled "Refinement of Shuttling Mechanism", attached hereto as Exhibit C and hereby incorporated by reference.

E. Linear Propulsion

It is believed that the invention may be used to achieve linear propulsion without resorting to interactions with an external mass (such as with a rocket or other propulsion system). Additional details are provided in the inventor's notes entitled "Linear Transduction," attached hereto as Exhibit D and hereby incorporated by reference.

F. Conclusion

The present invention is not limited to the embodiments disclosed herein, but also encompasses many other embodiments that, upon reading this disclosure, may be apparent to those skilled in the art. In the event of an inconsistency between this specification and the attached Exhibits, the description in this specification supersedes the conflicting description contained in the Exhibit.

What is claimed is:

1. A method for reducing the momentum of an oscillating body that moves to and from at least one zenith, the method comprising the steps of:
   (a) placing a mass at a launch area connected to the body, wherein the launch area is spaced-apart from a landing area that is connected to the body;
   (b) as the body moves toward the zenith, accelerating the mass away from the launch area and toward the landing area to impart on the body a first reactive force component in a direction opposite to that of the body's motion; and
   (c) allowing said mass to reach the landing area after the body has past the zenith and is moving away from the zenith, so that the arrival of the mass at the landing area imparts on the body a second reactive force component in a direction opposite that of the body's motion; whereby the combination of the first and second reactive force components imparts a net reduction in the momentum on the body.

2. The method of claim 1 wherein the oscillating body is a pendulum.

3. The method of claim 2 wherein the oscillating body is a resilient member.

4. The method of claim 1 wherein the mass is a fluid.

5. The method of claim 4 further comprising the step of providing a channel between the launch area and the landing area, wherein in the step of allowing the mass to move toward the landing area, the fluid mass is allowed to flow through the channel.

6. The method of claim 1 wherein the mass is a solid.

7. A method for reducing the momentum of an oscillating body whose velocity increases and decreases in a periodic manner under the influence of an ancillary force, comprising the steps of:
   (a) placing a mass at a launch area connected to the body; wherein the launch area is spaced-part from a landing area connected to the body;
   (b) accelerating the mass relative to the body in a direction away from the launch area and toward the landing area, to impart on the body a first reactive force component that is opposite in direction to the body's velocity, thereby reducing the body's velocity during the acceleration;
   (c) allowing the mass to move toward the landing area while the body's velocity increases under the influence of the ancillary force;
   (d) allowing the mass to arrive at the landing area in a reactive exchange that imparts to the body a second reactive force component; wherein: (i) the direction of the second reactive force component is opposite to the direction of the first reactive force component; and (ii) the magnitude of the second reactive force component is smaller than the magnitude of the first reactive force component; whereby the combination of the first and second reactive force components impart a net reduction in the momentum of the body.

8. The method of claim 7 wherein the oscillating body is a resilient member.

9. The method of claim 7 wherein the mass is a fluid.

10. The method of claim 9 further comprising the step of providing a channel between the launch area and the landing area, wherein in the step of allowing the mass to move toward the landing area, the fluid mass is allowed to flow through the channel.

11. The method of claim 7 wherein the mass is a solid.

12. A method for changing the momentum of a body rotating about an axis, comprising the steps of:
   (a) providing a chamber, the chamber being connected to the body at a first distance from the axis so that the chamber moves about the axis at a tangential velocity;
   (b) providing a mass at a first point connected to the chamber; wherein the first point is spaced-apart from a second point connected to the chamber;
   (c) accelerating the mass relative to the chamber in a direction away from the first point and toward the second point, to impart to the body a first reactive force component to the chamber in a direction that is opposite to the chamber's tangential velocity;

(d) while the mass moves from the first point to the second point, moving the chamber (and second point connected thereto) closer to the axis to increase the tangential velocity of the chamber; and (e) allowing the mass to arrive at the second point in a reactive exchange between the mass and the chamber that imparts a second force component to the chamber in a direction that is the same as the chamber's tangential velocity, said second force having a magnitude that is less than the magnitude of said first force; whereby the combination of the first and second forces result in a net reduction of the body's rotational momentum.

13. The method of claim 12 wherein the mass is a fluid.

14. The method of claim 13 further comprising the step of providing a channel between the launch area and the landing area, wherein in the step of allowing the mass to move toward the landing area, the fluid mass is allowed to flow through the channel.

15. The method of claim 12 wherein the mass is a solid.

16. The method of claim 12 further comprising the steps of:

(f) coupling a spacecraft to the body in a manner that allows the spacecraft to rotate about the axis;

(g) providing an electromagnetic drive mechanism to rotate the body relative to the spacecraft, whereby the drive mechanism imparts rotational momentum to the spacecraft in one direction and rotational momentum to the body in the opposite direction;

(h) decoupling the spacecraft from the body so that both the spacecraft and the body may rotate relative to each other in a free-wheeling mode about the axis.

17. The method of claim 13 wherein the steps of clauses (a) through (h) are repeated to impart additional rotational momentum to the spacecraft.

18. The method of claim 13 wherein the drive mechanism is an electric motor.

* * * * *